United States Patent
Deforge et al.

(10) Patent No.: US 8,983,394 B2
(45) Date of Patent: Mar. 17, 2015

(54) SYSTEMS AND METHODS FOR TESTING RADIO-BASED DEVICES

(71) Applicant: BlackBerry Limited, Waterloo (CA)

(72) Inventors: John Bradley Deforge, Chelsea (CA); Daniel Noel Badiere, Ottawa (CA); Christopher DeVries, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 225 days.

(21) Appl. No.: 13/734,455

(22) Filed: Jan. 4, 2013

(65) Prior Publication Data
US 2013/0122825 A1    May 16, 2013

Related U.S. Application Data

(63) Continuation of application No. PCT/CA2011/050344, filed on Jun. 6, 2011.

(51) Int. Cl.
*H04B 17/00* (2006.01)

(52) U.S. Cl.
CPC ............ *H04B 17/00* (2013.01); *H04B 17/002* (2013.01); *H04B 17/0027* (2013.01); *H04B 17/008* (2013.01); *H04B 17/0085* (2013.01)
USPC .... 455/67.11; 455/73; 455/67.14; 455/115.1; 455/115.2; 455/226.1

(58) Field of Classification Search
CPC .......... H04B 17/0012; H04B 17/0027; H04B 17/0085
USPC ............. 455/67.11, 67.14, 73, 83, 91, 115.1, 455/115.2, 130, 226.1
See application file for complete search history.

(56) References Cited

U.S. PATENT DOCUMENTS

| 5,497,379 | A | 3/1996 | Whetsel |
| 7,200,170 | B1 * | 4/2007 | Desandoli et al. ............ 375/224 |
| 7,263,355 | B2 | 8/2007 | Morikawa et al. |
| 7,716,542 | B2 * | 5/2010 | Chang et al. ................... 714/718 |

(Continued)

FOREIGN PATENT DOCUMENTS

| CN | 1599504 A | 3/2005 |
| EP | 0920146 A2 | 6/1999 |

(Continued)

OTHER PUBLICATIONS

Chinese Office Action for related Chinese Application No. 201180071466.5, dated Sep. 2, 2014, pp. 1-16.

(Continued)

*Primary Examiner* — Tuan Pham
(74) *Attorney, Agent, or Firm* — Conley Rose, P.C.; J. Robert Brown, Jr.

(57) ABSTRACT

Embodiments are disclosed of a switchplexer for performing test operations on a radio device. The switchplexer comprises a plurality of test ports corresponding to a plurality of radio device ports and a plurality of switches for routing test signals between the individual test ports. Processing logic is disclosed for controlling actuation of the switches to route test signals between individual test ports. The switchplexer disclosed herein may be incorporated into a mobile test device for self-test operations or may be used in a manufacturing or maintenance facility for testing and calibration operations.

20 Claims, 15 Drawing Sheets

(56) References Cited

U.S. PATENT DOCUMENTS

| | | | |
|---|---|---|---|
| 8,598,898 B2 * | 12/2013 | Sul et al. ................ | 324/750.3 |
| 2005/0239419 A1 | 10/2005 | Fudaba et al. | |
| 2006/0197538 A1 | 9/2006 | Leinonen et al. | |

FOREIGN PATENT DOCUMENTS

| | | |
|---|---|---|
| WO | 2010083082 A1 | 7/2010 |
| WO | 2010092082 A1 | 8/2010 |
| WO | 2011084715 A1 | 7/2011 |

OTHER PUBLICATIONS

International Search Report and Written Opinion dated Mar. 2, 2012 for Application No. PCT/CA2011/050344.

International Search Report, International Application No.—PCT/CA2011/050344, Mar. 2, 2012, 2 pages.

International Preliminary Report on Patentability for application PCT/CA2011/050344, mailed Dec. 10, 2013, 7 pages.

Extended European Search Report for related EP Application No. 11867480.3-185512719098, dated Oct. 22, 2014, pp. 1-7.

* cited by examiner

US 8,983,394 B2

SYSTEMS AND METHODS FOR TESTING RADIO-BASED DEVICES

CROSS-REFERENCE TO RELATED APPLICATIONS

This is a continuation of International Application No. PCT/CA2011/050344, entitled "SYSTEMS AND METHODS FOR TESTING RADIO-BASED DEVICES", filed Jun. 6, 2011, which is incorporated by reference in its entirety.

BACKGROUND

Today's radio-based electronic devices often require a multitude of calibration and testing steps in the final steps of production. These steps are performed not only to ensure proper assembly and functionality, but to likewise meet regulatory and customer requirements. Currently, these calibration and testing steps require each radio-based device to be connected to a manufacturing interface apparatus or fixtures that are part of what is commonly known as a test station. Each test station is typically comprised of equipment consisting of test instruments assembled into a rack of substantial size and mass that resides on the production floor. The battery of calibration and test steps that these test stations perform on each radio-based device are designed to ensure traceability, accuracy of calibration, and proper performance.

However, such calibration and test procedures usually require human operators to be present to load and offload the test stations, initiate procedures, and execute decisions based on results. Each test procedure takes time and resources to execute and production environments require that there be enough test stations to optimize manufacturing throughput and prevent production bottlenecks. As a result, it is not uncommon for many test stations to be present and collocated on the production floor. Additionally, the burden of radio front-end testing and calibration manifests itself not only in terms of direct labor costs, but also in capital costs associated with instrumentation, which typically requires ongoing upgrading and maintenance. Likewise, execution time is a factor, where production throughput is a function of number of test stations, global manufacturing capabilities, and associated engineering support. Furthermore, different radio-based devices often require unique fixturing or test instruments that are specific to the device itself. Moreover, new features are introduced as new radio platforms are produced, with corresponding requirements for new calibration and test procedures.

It is currently well known that radio-based devices in the field are subject to many diverse operational conditions relating to the radio channel, interfering signals, loss of signal, noise, as well as platform related issues such as software, firmware or hardware related faults. However, radio-based devices are currently required to be tethered to a test station to perform a test or calibration procedure as opposed to performing tests and calibration procedures anywhere and at any time. Accordingly, an onboard, self-test capability that provides an ability to invoke a test remotely, or to recognize and capture a fault as it occurs, would be advantageous to pinpointing its cause and determining a corrective action. However, no current approach exists to remotely initiate a radio front-end test that reads and records such information, which prevents realizing the benefits of in situ testing capabilities that could be remotely executed.

BRIEF DESCRIPTION OF THE DRAWINGS

The present disclosure may be understood, and its numerous objects, features and advantages obtained, when the following detailed description is considered in conjunction with the following drawings, in which.

DETAILED DESCRIPTION

Figure 1:
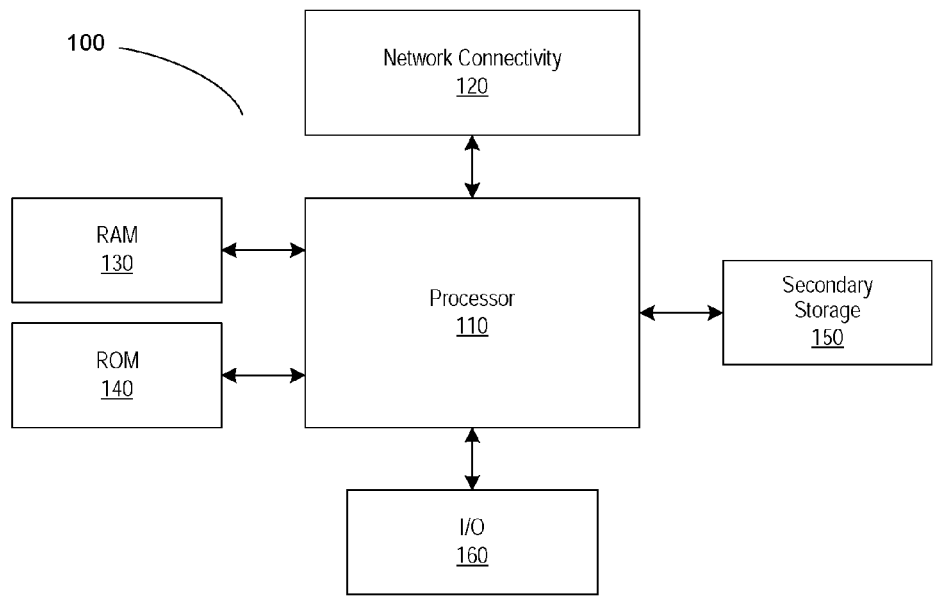
FIG. 1 depicts an exemplary system in which the present disclosure may be implemented.

The present disclosure is directed in general to communications systems and methods for operating same. In some aspects, the present disclosure relates to the methods, systems and devices for testing and calibrating radio devices.

An embodiment is directed to a switchplexer for performing test operations on a radio device, comprising: a plurality of test ports corresponding to a plurality of radio device ports; a plurality of switches comprising at least a transmitter switch and a receiver switch, the transmitter switch configured to allow testing via a transmitter path and the receiver switch configured to allow testing via a receiver path; a circuit operable to provide a test signal measurement value corresponding to the presence of a test signal at individual test ports of said plurality of test ports; and processing logic operable to actuate said plurality of switches to route said test signal between said individual test ports; wherein said test signal measurement values are used to perform self-test operations associated with at least a transmitter or a receiver of said radio device via the transmitter path or the receiver path, respectively.

An embodiment is directed to a computer-implemented method of using a switchplexer to perform test operations on a radio device, comprising: providing a plurality of test ports corresponding to a plurality of radio device ports; providing a plurality of switches comprising at a least one transmitter switch and at least one receiver switch; generating a test signal measurement value corresponding to the presence of a test signal at individual test ports of said plurality of test ports; and using processing logic to actuate said plurality of switches to route said test signal between said individual test ports; wherein said test signal measurement values are used to perform self-test operations associated with a transmitter and/or a receiver of said radio device.

An embodiment is directed to a switchplexer for performing calibration operations on a radio device, comprising: a plurality of test ports corresponding to a plurality of radio device ports, the plurality of test ports comprising at least a transmitter test port and a receiver test port; a plurality of switches comprising at least a transmitter switch and a receiver switch, the transmitter switch configured to allow testing via a transmitter path and the receiver switch configured to allow testing via a receiver path; a circuit operable to provide a test signal measurement value corresponding to the presence of a test signal at individual test ports of said plurality of test ports; and processing logic operable to actuate said plurality of switches to route said test signal between said individual test ports; wherein said test signal measurement values are used to perform calibration operations associated with a transmitter and/or a receiver of said radio device.

Devices and methods for testing and calibrating radio devices are described hereinbelow. Various illustrative embodiments of the present disclosure will now be discussed in detail with reference to the accompanying figures. While various details are set forth in the following description, it will be appreciated that the present disclosure may be practiced without these specific details, and that numerous implementation-specific decisions may be made to the disclosure described herein to achieve the inventor's specific goals, such as compliance with process technology or design-related constraints, which will vary from one implementation to another. While such a development effort might be complex and time-consuming, it would nevertheless be a routine undertaking for those of skill in the art having the benefit of this disclosure. For example, selected aspects are shown in block diagram and flow chart form, rather than in detail, in order to avoid limiting or obscuring the present disclosure. In addition, some portions of the detailed descriptions provided herein are presented in terms of algorithms or operations on data within a computer memory. Such descriptions and representations are used by those skilled in the art to describe and convey the substance of their work to others skilled in the art.

As used herein, the terms "component," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a computer and the computer itself can be a component. One or more components may reside within a process or thread of execution and a component may be localized on one computer or distributed between two or more computers.

As used herein, the terms "user equipment" and "UE" can refer to wireless devices such as mobile telephones, smart phones, personal digital assistants (PDAs), handheld or laptop computers, and similar devices or other user equipment that has telecommunications capabilities. In some embodiments, the term "UE" may refer to a mobile, wireless device. The term "UE" may also refer to devices that have similar capabilities but that are not generally transportable, such as desktop computers, set-top boxes, or network nodes.

The term "article of manufacture" (or alternatively, "computer program product") as used herein is intended to encompass a computer program accessible from any computer-readable device or media. For example, computer readable media can include but are not limited to magnetic storage devices (e.g., hard disk, floppy disk, magnetic strips, etc.), optical disks such as a compact disk (CD) or digital versatile disk (DVD), smart cards, and flash memory devices (e.g., card, stick, etc.).

The word "exemplary" is used herein to mean serving as an example, instance, or illustration. Any aspect or design described herein as "exemplary" is not necessarily to be construed as preferred or advantageous over other aspects or designs. Those of skill in the art will recognize many modifications may be made to this configuration without departing from the scope, spirit or intent of the claimed subject matter. Furthermore, the disclosed subject matter may be implemented as a system, method, apparatus, or article of manufacture using standard programming and engineering techniques to produce software, firmware, hardware, or any combination thereof to control a computer or processor-based device to implement aspects detailed herein.

FIG. 1 illustrates an example of a system 100 suitable for implementing one or more embodiments disclosed herein. In various embodiments, the system 100 comprises a processor 110, which may be referred to as a central processor unit (CPU) or digital signal processor (DSP), network connectivity devices 120, random access memory (RAM) 130, read only memory (ROM) 140, secondary storage 130, and input/output (I/O) devices 160. In some embodiments, some of these components may not be present or may be combined in various combinations with one another or with other components not shown. These components may be located in a single physical entity or in more than one physical entity. Any actions described herein as being taken by the processor 110 might be taken by the processor 110 alone or by the processor 110 in conjunction with one or more components shown or not shown in FIG. 1.

The processor 110 executes instructions, codes, computer programs, or scripts that it might access from the network connectivity devices 120, RAM 130, or ROM 140. While only one processor 110 is shown, multiple processors may be present. Thus, while instructions may be discussed as being executed by a processor 110, the instructions may be executed simultaneously, serially, or otherwise by one or multiple processors 110 implemented as one or more CPU chips.

In various embodiments, the network connectivity devices 120 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 120 may enable the processor 110 to communicate with the Internet or one or more telecommunications networks or other networks from which the processor 110 might receive information or to which the processor 110 might output information.

The network connectivity devices 120 may also be capable of transmitting or receiving data wirelessly in the form of electromagnetic waves, such as radio frequency signals or microwave frequency signals. Information transmitted or received by the network connectivity devices 120 may include data that has been processed by the processor 110 or instructions that are to be executed by processor 110. The data may be ordered according to different sequences as may be desirable for either processing or generating the data or transmitting or receiving the data.

In various embodiments, the RAM 130 may be used to store volatile data and instructions that are executed by the processor 110. The ROM 140 shown in FIG. 1 may be used to store instructions and perhaps data that are read during execution of the instructions. Access to both RAM 130 and ROM 140 is typically faster than to secondary storage 150. The secondary storage 150 is typically comprised of one or more disk drives or tape drives and may be used for non-volatile storage of data or as an over-flow data storage device if RAM 130 is not large enough to hold all working data. Secondary storage 150 may be used to store programs that are loaded into RAM 130 when such programs are selected for execution. The I/O devices 160 may include liquid crystal displays (LCDs), touch screen displays, keyboards, keypads, switches, dials, mice, track balls, voice recognizers, card readers, paper tape readers, printers, video monitors, or other well-known input/output devices.

Figure 2:
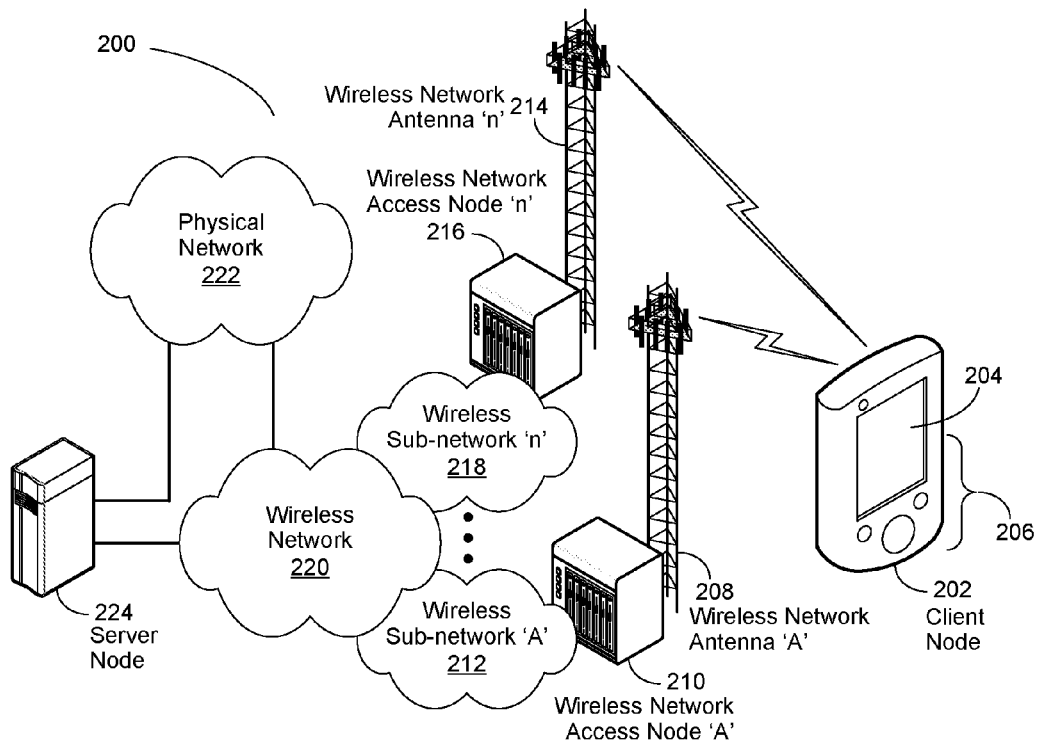
FIG. 2 shows a wireless communications system including an embodiment of a user equipment (UE) device.

FIG. 2 shows a wireless communications system including an embodiment of a user equipment (UE) device. Though illustrated as a mobile phone, the UE device 202 may take various forms including a mobile phone, a wireless handset, a pager, or a personal digital assistant (PDA). In various embodiments, the UE device 202 may also comprise a portable computer, a tablet computer, a laptop computer, or any computing device operable to perform data communication operations. Many suitable devices combine some or all of these functions. In some embodiments, the UE device 202 is not a general purpose computing device like a portable, laptop, or tablet computer, but rather is a special-purpose communications device such as a telecommunications device installed in a vehicle. The UE device 202 may likewise be a device, include a device, or be included in a device that has similar capabilities but that is not transportable, such as a desktop computer, a set-top box, or a network node. In these and other embodiments, the UE device 202 may support specialized activities such as gaming, inventory control, job control, task management functions, and so on.

In various embodiments, the UE device 202 includes a display 204. In these and other embodiments, the UE device 202 may likewise include a touch-sensitive surface, a keyboard or other input keys 206 generally used for input by a user. The input keys 206 may likewise be a full or reduced alphanumeric keyboard such as QWERTY, Dvorak, AZERTY, and sequential keyboard types, or a traditional numeric keypad with alphabet letters associated with a telephone keypad. The input keys 206 may likewise include a trackwheel, an exit or escape key, a trackball, and other navigational or functional keys, which may be inwardly depressed to provide further input function. The UE device 202 may likewise present options for the user to select, controls for the user to actuate, and cursors or other indicators for the user to direct.

The UE device 202 may further accept data entry from the user, including numbers to dial or various parameter values for configuring the operation of the UE device 202. The UE device 202 may further execute one or more software or firmware applications in response to user commands. These applications may configure the UE device 202 to perform various customized functions in response to user interaction. Additionally, the UE device 202 may be programmed or configured over-the-air (OTA), for example from a wireless network access point 'A' 210 through 'n' 216 (e.g., a base station), a server 224, or a peer UE device 202.

Among the various applications executable by the UE device 202 are a web browser, which enables the display 204 to display a web page. The web page may be obtained from a server 224 through a wireless connection with a wireless network 220. The various applications may likewise be obtained from a peer UE device 202 or other system over a connection to the wireless network 220 or any other wireless communication network or system. In various embodiments, the wireless network 220 comprises a plurality of wireless sub-networks (e.g., cells) 'A' 212 through 'n' 218. In these and other embodiments, the UE device 202 establishes a wireless communication session with wireless network antenna 'A' 208 through 'n' 214 (e.g., a cell tower), which are respectively coupled to a wireless network access point 'A' 210 through 'n' 216. In turn, the wireless network access points 'A' 210 through 'n' 216 are respectively coupled to wireless sub-networks 'A' 212 through 'n' 218, which are connected to the wireless network 220.

In various embodiments, the wireless network 220 is coupled to a physical network 222, such as the Internet. Via the wireless network 220 and the physical network 222, the UE device 202 has access to information on various servers, such as the server 224. The server 224 may provide content that may be shown on the display 204. Alternately, the UE device 202 may access the wireless network 220 through a peer UE device 202 acting as an intermediary, in a relay type or hop type of connection. Skilled practitioners of the art will recognize that many such embodiments are possible and the foregoing is not intended to limit the spirit, scope, or intention of the disclosure.

Figure 3:
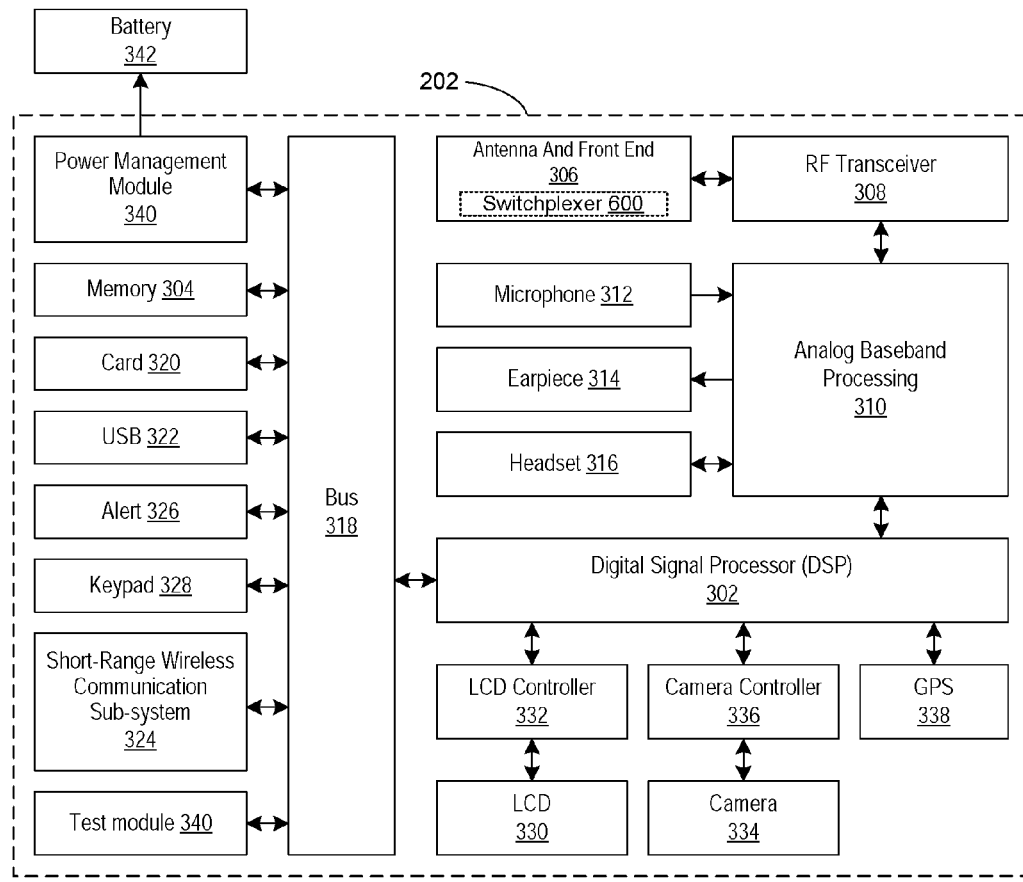
FIG. 3 is a simplified block diagram of an exemplary UE device comprising a digital signal processor (DSP)

FIG. 3 depicts a block diagram of an exemplary user equipment (UE) device 202 in which the present disclosure may be implemented. While various components of a UE device 202 are depicted, various embodiments of the UE device 202 may include a subset of the listed components or additional components not listed. As shown in FIG. 3, the UE device 202 includes a digital signal processor (DSP) 302 and a memory 304. As shown, the UE device 202 may further include an antenna and front end unit 306, a radio frequency (RF) transceiver 308, an analog baseband processing unit 310, a microphone 312, an earpiece speaker 314, a headset port 316, an input/output (I/O) interface 318, a removable memory card 320, a universal serial bus (USB) port 322, a short range wireless communication sub-system 324, an alert 326, a keypad 328, a liquid crystal display (LCD) 330, which may include a touch sensitive surface, an LCD controller 332, a charge-coupled device (CCD) camera 334, a camera controller 336, and a global positioning system (GPS) sensor 338. In various embodiments, the UE device 202 may include another kind of display that does not provide a touch sensitive screen. In an embodiment, the DSP 302 may communicate directly with the memory 304 without passing through the input/output interface 318.

In various embodiments, the DSP 302 or some other form of controller or central processing unit (CPU) operates to control the various components of the UE device 202 in accordance with embedded software or firmware stored in memory 304 or stored in memory contained within the DSP 302 itself. In addition to the embedded software or firmware, the DSP 302 may execute other applications stored in the memory 304 or made available via information carrier media such as portable data storage media, like the removable memory card 320 or via wired or wireless network communications. The application software may comprise a compiled set of machine-readable instructions that configure the DSP 302 to provide the desired functionality, or the application software may be high-level software instructions to be processed by an interpreter or compiler to indirectly configure the DSP 302.

The antenna and front end unit 306 may be provided to convert between wireless signals and electrical signals, enabling the UE device 202 to send and receive information from a cellular network or some other available wireless communications network or from a peer UE device 202. In various embodiments, a switchplexer 600, discussed hereinbelow in connection with FIGS. 6-14, is operable to perform testing and diagnostic functions. In some embodiments, the antenna and front-end unit 306 may include multiple antennas to support beam forming and/or multiple input multiple output (MIMO) operations. As is known to those skilled in the art, MIMO operations may provide spatial diversity which can be used to overcome difficult channel conditions or to increase channel throughput. Likewise, the antenna and front end unit 306 may include antenna tuning or impedance matching components, RF power amplifiers, or low noise amplifiers.

In various embodiments, the RF transceiver 308 provides frequency shifting, converting received RF signals to baseband and converting baseband transmit signals to RF. In some descriptions a radio transceiver or RF transceiver may be understood to include other signal processing functionality such as modulation/demodulation, coding/decoding, inter leaving/deinterleaving, spreading/despreading, inverse fast Fourier transforming (IFFT)/fast Fourier transforming (FFT), cyclic prefix appending/removal, and other signal processing functions. For purposes of clarity, the description here separates the description of this signal processing from the RF and/or radio stage and conceptually allocates that signal processing to the analog baseband processing unit 310 or the DSP 302 or other central processing unit. In some embodiments, the RF Transceiver 108, portions of the antenna and front end 306, and the analog base band processing unit 310 may be combined in one or more processing units and/or application specific integrated circuits (ASICs).

The analog baseband processing unit 310 may provide various analog processing of inputs and outputs, for example analog processing of inputs from the microphone 312 and the headset 316 and outputs to the earpiece 314 and the headset 316. To that end, the analog baseband processing unit 310 may have ports for connecting to the built-in microphone 312 and the earpiece speaker 314 that enable the UE device 202 to be used as a cell phone. The analog baseband processing unit 310 may further include a port for connecting to a headset or other hands-free microphone and speaker configuration. The analog baseband processing unit 310 may provide digital-to-analog conversion in one signal direction and analog-to-digital conversion in the opposing signal direction. In various embodiments, at least some of the functionality of the analog baseband processing unit 310 may be provided by digital processing components, for example by the DSP 302 or by other central processing units.

The DSP 302 may perform modulation/demodulation, coding/decoding, inter leaving/deinterleaving, spreading/despreading, inverse fast Fourier transforming (IFFT)/fast Fourier transforming (FFT), cyclic prefix appending/removal, and other signal processing functions associated with wireless communications. In one embodiment, for example in a code division multiple access (CDMA) technology application, for a transmitter function the DSP 302 may perform modulation, coding, interleaving, and spreading, and for a receiver function the DSP 302 may perform despreading, deinterleaving, decoding, and demodulation. In another embodiment, for example in an orthogonal frequency division multiplex access (OFDMA) technology application, for the transmitter function the DSP 302 may perform modulation, coding, interleaving, inverse fast Fourier transforming, and cyclic prefix appending, and for a receiver function the DSP 302 may perform cyclic prefix removal, fast Fourier transforming, deinterleaving, decoding, and demodulation. In other wireless technology applications, yet other signal processing functions and combinations of signal processing functions may be performed by the DSP 302.

The DSP 302 may communicate with a wireless network via the analog baseband processing unit 310. In some embodiments, the communication may provide Internet connectivity, enabling a user to gain access to content on the Internet and to send and receive e-mail or text messages. The input/output interface 318 interconnects the DSP 302 and various memories and interfaces. The memory 304 and the removable memory card 320 may provide software and data to configure the operation of the DSP 302. Among the interfaces may be the USB interface 322 and the short range wireless communication sub-system 324. The USB interface 322 may be used to charge the UE device 202 and may also enable the UE device 202 to function as a peripheral device to exchange information with a personal computer or other computer system. The short range wireless communication sub-system 324 may include an infrared port, a Bluetooth interface, an IEEE 802.11 compliant wireless interface, or any other short range wireless communication sub-system, which may enable the UE device 202 to communicate wirelessly with other nearby mobile devices and/or wireless base stations.

The input/output interface 318 may further connect the DSP 302 to the alert 326 that, when triggered, causes the UE device 202 to provide a notice to the user, for example, by ringing, playing a melody, or vibrating. The alert 326 may serve as a mechanism for alerting the user to any of various events such as an incoming call, a new text message, and an appointment reminder by silently vibrating, or by playing a specific pre-assigned melody for a particular caller.

The keypad 328 couples to the DSP 302 via the I/O interface 318 to provide one mechanism for the user to make selections, enter information, and otherwise provide input to the UE device 202. The keyboard 328 may be a full or reduced alphanumeric keyboard such as QWERTY, Dvorak, AZERTY and sequential types, or a traditional numeric keypad with alphabet letters associated with a telephone keypad. The input keys may likewise include a trackwheel, an exit or escape key, a trackball, and other navigational or functional keys, which may be inwardly depressed to provide further input function. Another input mechanism may be the LCD 330, which may include touch screen capability and also display text and/or graphics to the user. The LCD controller 332 couples the DSP 302 to the LCD 330.

The CCD camera 334, if equipped, enables the UE device 202 to take digital pictures. The DSP 302 communicates with the CCD camera 334 via the camera controller 336. In another embodiment, a camera operating according to a technology other than Charge Coupled Device cameras may be employed. The GPS sensor 338 is coupled to the DSP 302 to decode global positioning system signals, thereby enabling the UE device 202 to determine its position. Various other peripherals may also be included to provide additional functions, such as radio and television reception. In various embodiments, the test module 340 is implemented to perform self-test and calibration operations described in greater detail herein.

Figure 4:
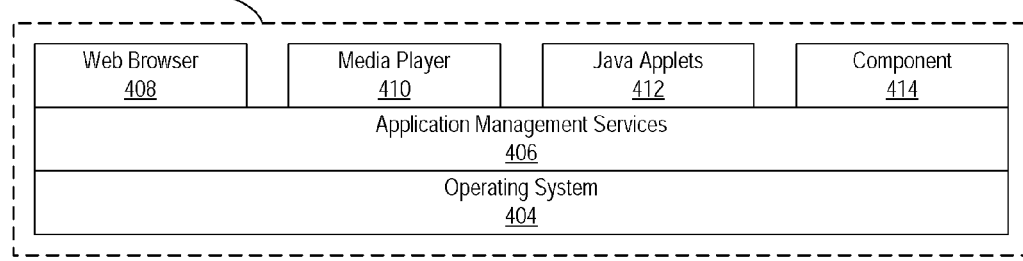
FIG. 4 is a simplified block diagram of a software environment that may be implemented by the DSP.

FIG. 4 illustrates a software environment 402 that may be implemented by the DSP 302. The DSP 302 executes operating system drivers 404 that provide a platform from which the rest of the software operates. The operating system drivers 404 provide drivers for the UE device 202 hardware with standardized interfaces that are accessible to application software. The operating system drivers 404 include application management services (AMS) 406 that transfer control between applications running on the UE device 202. Also shown in FIG. 4 are a web browser application 408, a media player application 410, and Java applets 412. The web browser application 408 configures the UE device 202 to operate as a web browser, allowing a user to enter information into forms and select links to retrieve and view web pages. The media player application 410 configures the UE device 202 to retrieve and play audio or audiovisual media. The Java applets 412 configure the UE device 202 to provide games, utilities, and other functionality. A component 414 might provide functionality described herein. The UE device 202, a base station 210, and other components described herein might include a processing component that is capable of executing instructions related to the actions described above.

Figure 5:
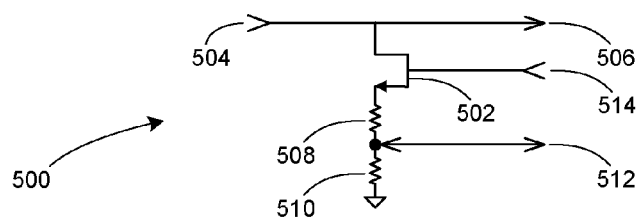
FIG. 5 is a generalized schematic diagram illustrating a field-effect transistor (FET) switch as implemented in embodiments of the disclosure.

FIG. 5 is a generalized schematic diagram illustrating a broadband bidirectional power-tap comprised of resistor network impedances 508 and 510 and a switch 502, together which provide a switched power tap 500. The switch in this exemplary embodiment is implemented using a field effect transistor (FET) 502 but is not limited to a FET transistor as is obvious to those skilled in the art. The switched power tap of the current disclosure is implemented to be practically undetectable when the switch is in a high impedance state wherein the switch can be said to be OFF. In the state wherein said switch can be said to be ON or the low impedance state, the characteristic impedance of the switched power tap remains sufficiently high as to not detrimentally perturb the performance of the incident signal path 504 to 506 from which said switched power tap is designed to tap power. Accordingly, this same switched power tap does attenuate the signal power tapped from incident signal path 504 to 506 at port 512. The switched power tap is broadband by design by nature of the dominant resistive (or real) impedance components and minimized capacitive and inductive (imaginary) component attributes. The switched power tap is naturally bidirectional as it possesses no features to limit directionality of signal flow.

The switched power tap 500 shown in FIG. 5 can be used in various embodiments of the disclosure as described hereinbelow. In the FET switch shown in FIG. 5, node 504 is coupled to a source and node 506 is coupled to a load. The signal that passes between 504 and 506 can be said to be the incident signal present between the source and the load. The FET 502 provides a high impedance when it is not activated. When activated, the FET 502, in combination with the resistor 508, provides an impedance of approximately 500 ohms between the point 504 and 512, which, to the incident signal, is equivalent to conventional switches coupled with voltage dividers. In various embodiments, the gate 514 of FET 502 is used to perform the aforementioned activation.

In these and other embodiments, the FET 502 and resistor 508 combination shown in FIG. 5 is not limited to 500 ohms Rather the combination is chosen for reference only. This value is chosen to provide the desired amount of tapped power and is flexible to facilitate design tradeoffs when considering perturbation of the incident signal between ports 504 and 506. Resistor 510 is connected between the tapped port 512 and ground to provide a 50 ohm impedance to circuitry to which port 512 is connected. In various embodiments, the FET 502 in concert with resistor 508 and 510, forms a voltage divider tapping a portion of signal from the incident signal between 504 and 506 and acts as a power tap when terminated in a nominal impedance. The circuit described here is bi-directional and is broadband by design.

Figure 6:
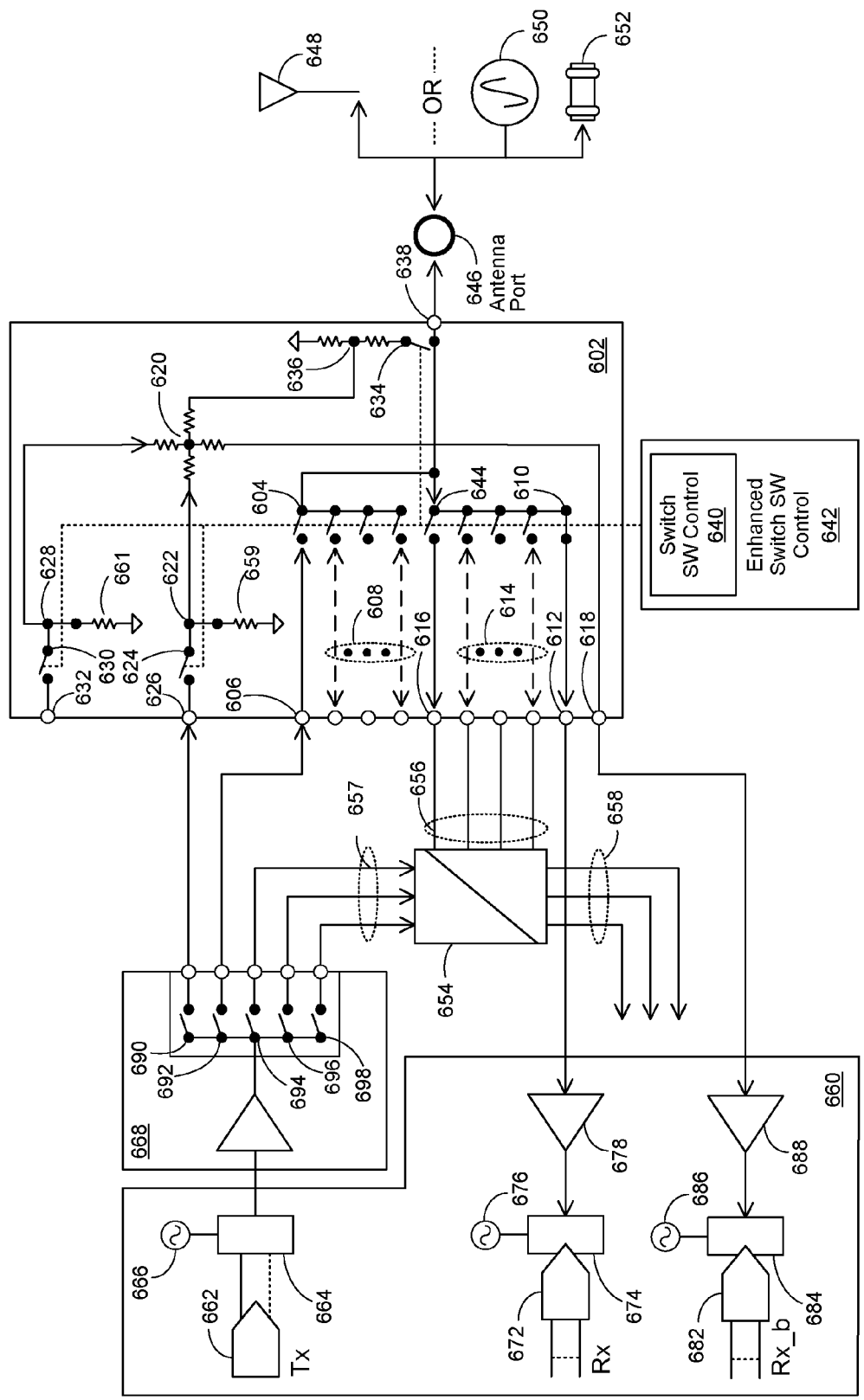
FIG. 6 is a simplified block diagram of a UE radio transceiver front end and front end antenna switch module (or switchplexer) as used to perform live-air receiver test and manufacturing calibration operations.

FIG. 6 is a simplified block diagram of a UE radio transceiver front end and front end antenna switch module (or switchplexer) as implemented in accordance with an embodiment of the disclosure to perform live-air receiver test and manufacturing calibration operations and to perform in receive (Rx) mode. In this embodiment, the switchplexer 602 comprises a transmitter (Tx) switch 604 coupled to a corresponding Tx test port 606 and a receiver (Rx) switch 610 coupled to a corresponding live-air Rx test port 612. The switchplexer 602 likewise comprises a plurality of additional (Tx) 608 switches coupled to corresponding Tx ports, a transmit (Tx) and receive (Rx) bidirectional path switch 644 and Tx/Rx test port 616, and a plurality of additional Tx/Rx bidirectional paths 614 and switches coupled to corresponding duplexer 654 common ports 656, which allow the testing of a plurality of Tx and Rx paths. As an example, a Tx and Rx path for a predetermined communications band may use the same switch within the switchplexer 602 when a duplexer 654 is implemented as described in greater detail herein. As another example, separate switches may be respectively used for Tx and Rx paths for a predetermined technology (e.g., GSM) within the same communication band. Likewise, each Tx and Rx path may be mutually exclusive and not share the same receivers with a device under test 660. In such cases, the mutual exclusivity, and band-wise exclusivity, is accommodated by the setting of switches within the switchplexer 602 as described in greater detail herein.

In this and various other embodiments, the operation of the Tx switch 604 and Rx switch 610, along with the additional Tx 608 and Tx/Rx 616 and 614 switches, is controlled by a switch software (SW) control module 640. Likewise, the switchplexer 602 comprises an antenna test port 638, which is operably coupled to an antenna port 646, which in turn is coupled in this and other embodiments to an antenna 648, or alternatively, to a signal generator 650 or a power sensor 652. In one embodiment, the signal generator 650 may be comprised of a pseudo random bit sequence (PRBS) generator. In various embodiments, the power sensor 652 is implemented as a Tx sink and may comprise a power detector, a spectrum or event analyzer, or a PRBS sink. In one embodiment, the signal generator 650 and the power sensor 652 are combined in what is known in the art as a wireless communications test set or "call box."

The device under test 660, such as a client node, mobile device, or a user equipment (UE) device as described in greater detail herein, comprises a Tx digital to analog (DAC) converter 662 coupled to a TX modulator 664, which receives frequency signals from a corresponding Tx oscillator 666. In this and various other embodiments, output signals from the Tx modulator 664 are provided to an external Tx power amplifier (PA) 668, where they are amplified. As shown in FIG. 6, the Tx PA 668 likewise comprises a plurality of Tx Pa mode switches 690, 692, 694, 696, and 698. As likewise shown in FIG. 6, the TX PA mode switches 694, 696 and 698 are operably coupled to the duplexer 654 Tx input ports 657, and likewise comprising duplexer common ports 656, operably and bidirectionally coupled to the switchplexer 602, and a set of duplexer Rx output ports 658, operable to be coupled to the device under test 660.

In various embodiments, the amplified output signals are provided by the Tx PA 668 to the switchplexer 602 via the Tx test port 606. In this and other embodiments, the device under test 660 likewise comprises a live-air Rx low noise amplifier (LNA) 678, which is coupled to the switchplexer 602 via the live-air Rx port 612. In these various embodiments, the live-air Rx port 612 is used by a live-air Rx LNA 678 to receive input signals from the switchplexer 602. A live-air Rx LNA 678 is in turn coupled to a live-air Rx demodulator 674, which receives frequency signals from a corresponding live-air Rx oscillator 676. In turn, a live-air Rx demodulator 674 is coupled to a live-air Rx analog to digital (ADC) converter 672 for signal detection.

The device under test 660 likewise comprises a broadband Rx LNA 688, which is coupled to the switchplexer 602 via a broadband Rx port 618. In various embodiments, a broadband Rx port 618 is used by a broadband Rx LNA 688 to receive input signals from the switchplexer 602. In these and other embodiments, a broadband Rx LNA 688 is coupled to a broadband Rx demodulator 684, which receives frequency signals from a corresponding broadband Rx oscillator 686, which in turn is coupled to a broadband Rx ADC converter 682 for signal detection. In this and various embodiments, the broadband receiver portion of the device under test 660 is architected and instantiated without the channel limiting filtering found in a typical live-air receiver. As such, it may be used to receive signals that are typical, but not limited to, the device under test's 660 receive band and transmit band. For example, the duplexer 654 may be implemented in various embodiments to restrict the flow of Tx frequencies to a predetermined band of frequency values. Conversely, as described in greater detail herein, the duplexer 654 may be bypassed in various other embodiments to provide a self-generated receive band stimulus signal.

In this and various other embodiments, switchplexer 602 further comprises, but is not limited to, a power combiner/divider 620, a first 626 bypass test port, and a second 632 bypass test port. As shown in FIG. 6, the first 626 and second 632 bypass test ports are respectively coupled to a first 624 and second 630 bypass test port isolation switches, which are in turn coupled to a first 622 and second 628 bypass test port termination shunt switch. As shown in FIG. 6, the first 622 and second 628 bypass test port termination shunt switches are respectively coupled to a termination shunt resistor 659 and 661 to ground as well as a bidirectional power combiner/divider 620. Likewise, a proportional amount of signal present on the combiner/divider 620 is also present at a bidirectional antenna power tap port 636 and broadband receive port 618. A switched power tap port 636 is instantiated in a fashion in this embodiment as to be undetectable to incident signal flowing on the incident signal path between switches 604, 608, 610, 614, and 644, and the antenna test port 638 and the incident signal remains unperturbed with switch 634 in its OFF state. Likewise in the present disclosure, switch 634 in its ON state and the characteristic impedance of power tap 636 minimizes impact to performance of the RF signal traveling on the incident signal path. The power tap 636 is both broadband and bidirectional.

In the various embodiments shown in FIGS. 6-12, the power tap switch 634 and port 636 can be implemented using the power tap switch 500 shown in FIG. 5. The power tap switch corresponds to FET 502. Port 638 corresponds to the juncture of the terminal of FET 502 with signal path 504/506 and port 636 corresponds to terminal 512 at the juncture of impedances 508/510.

A signal present at a bidirectional antenna power tap port 636, enabled by the closure of the antenna port power tap switch 634, produces a proportional signal voltage between the power tap port 636 and the incident signal path. Accordingly, a stimulus signal voltage present on the incident signal path and flowing through the antenna test port 638 and on to the antenna port 646, where it is terminated into a nominal impedance may be measured as power. Likewise and simultaneously a signal present on the incident signal path splits between the antenna port and corresponding switched ports 604, 608, 614, 644, or 610 where measurable power is determined through termination of the signal into nominal impedance of the coupled circuitry. As likewise shown in FIG. 6, in the current embodiment, switches 626, 630, 628, 622, and 634 are under control of the enhanced switch SW control 642.

In this embodiment, live-air Rx reception test and Rx manufacturing calibration signals are received by the switchplexer 602 via the antenna port 646, which in turn is coupled to the antenna test port 638, which receives the signals either through the antenna 648, or alternatively, from the signal generator 650. In turn, the Rx test and calibration signals are routed through the switchplexer 602 by the switch SW control module 640 closing the Rx switch 610 while simultaneously keeping the Tx switch 604 open. As shown in FIG. 6, the RX test and calibration signals are then provided through the live-air Rx test port 612 to the live-air Rx LNA 678.

Figure 7:
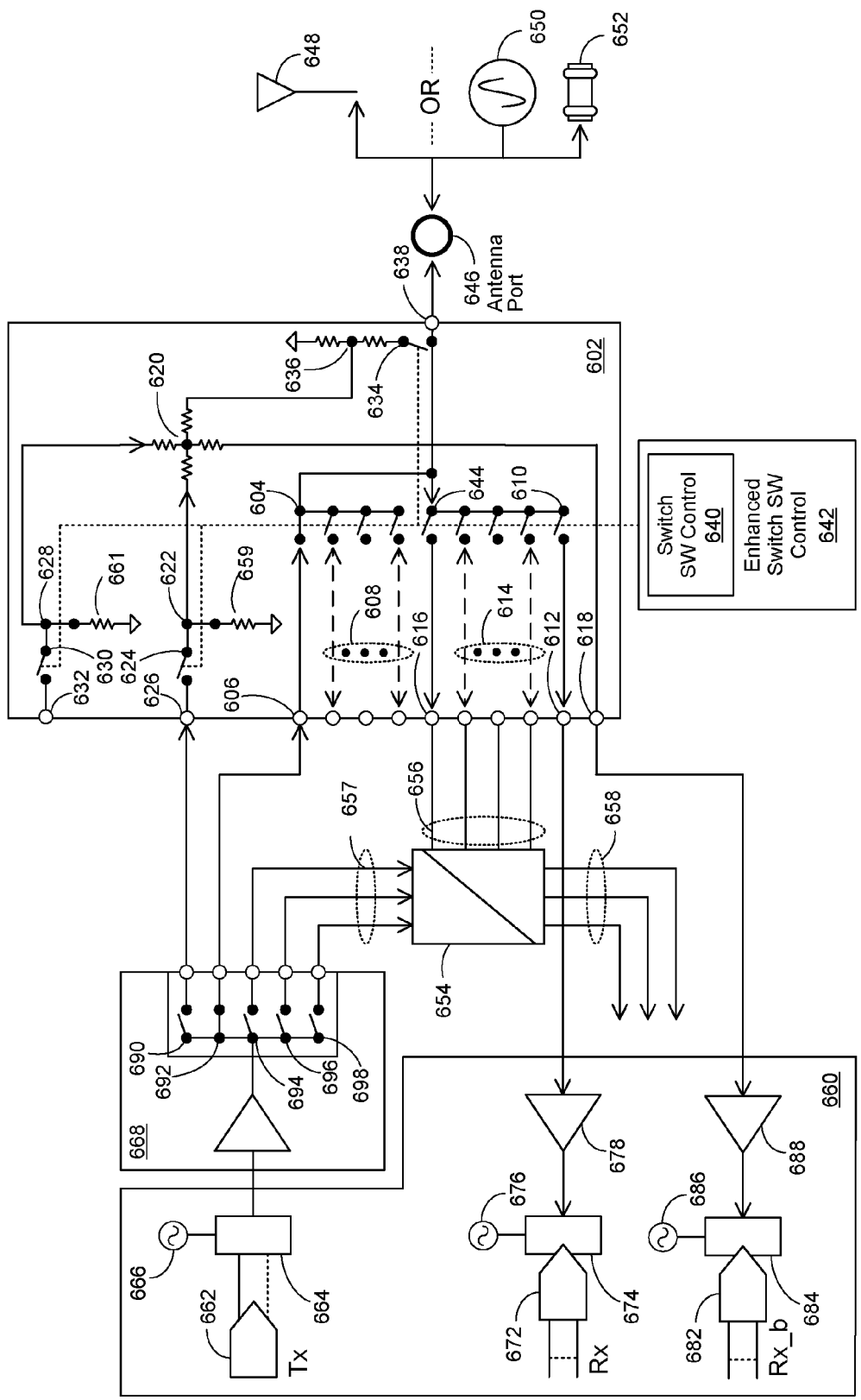
FIG. 7 is a simplified block diagram of a UE radio transceiver front end and switchplexer as used to perform live-air transmitter test and manufacturing calibration operations.

FIG. 7 is a simplified block diagram of a UE radio transceiver front end and switchplexer as implemented in accordance with an embodiment of the disclosure to perform live-air transmitter test, manufacturing calibration operations, and to perform operationally in Transmit (Tx) mode. In this embodiment, live-air transmitter (Tx) transmission test and manufacturing calibration signals are received from the device under test 660 by the switchplexer 602 through the Tx test port 606. In turn, the Tx test and calibration signals are routed through the switchplexer 602 by the switch SW control module 640 closing the Tx switch 604 while simultaneously keeping the Rx switch 610 open. As shown in FIG. 7, the TX test and calibration signals are then provided through the antenna test port 638, and then to the antenna port 646, and in turn to the antenna 648, or alternatively, power sensor 652.

Figure 8:
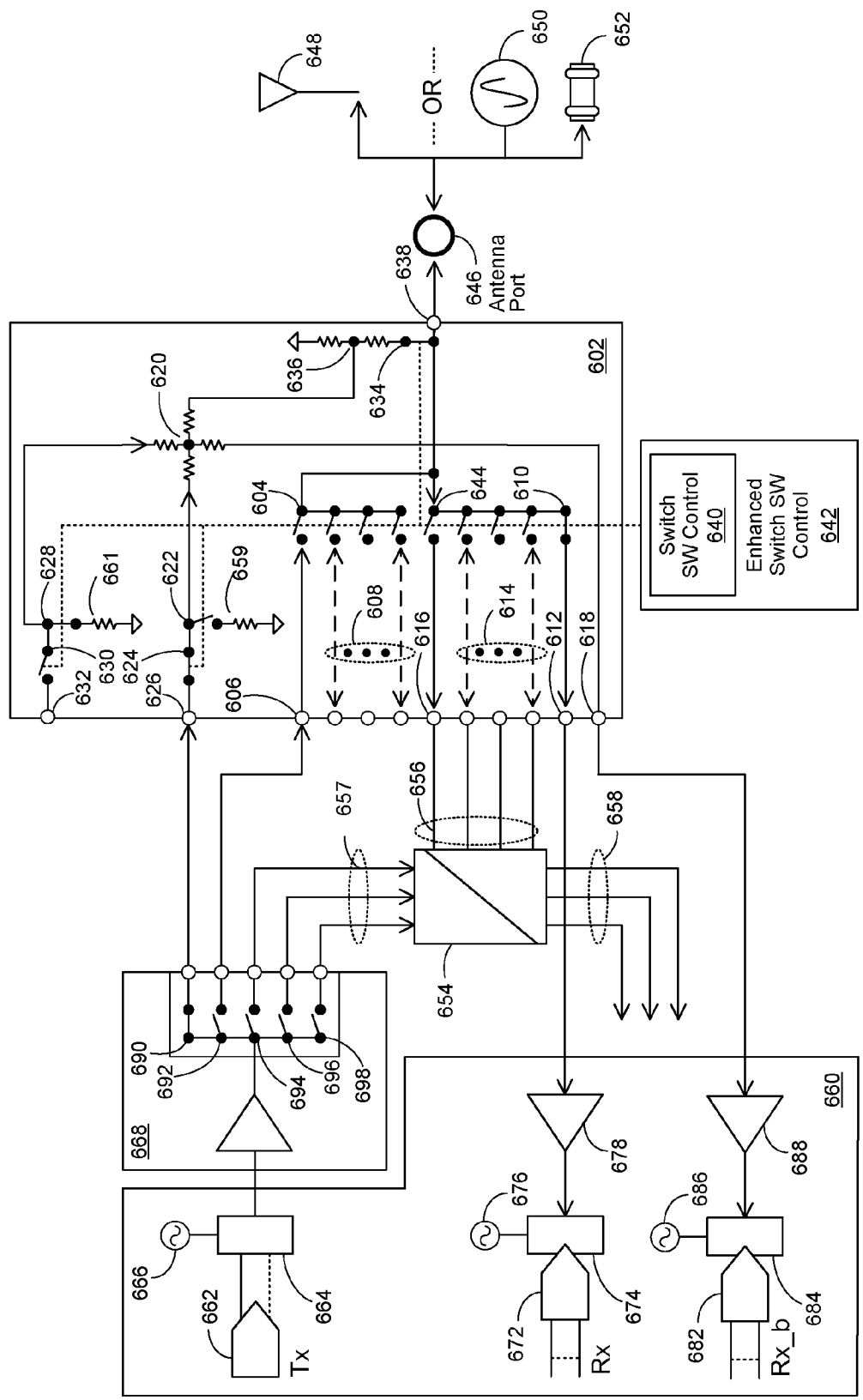
FIG. 8 is a simplified block diagram of a UE radio transceiver front end and switchplexer as used to perform Rx self-test and calibration operations by using a transmit signal generated by the device under test as a source signal or stimulus.

FIG. 8 is a simplified block diagram of a UE radio transceiver front end and switchplexer as implemented in accordance with an embodiment of the disclosure to perform receiver (Rx) self-test and calibration operations using a self generated stimulus signal created by a transmitter of the device under test. In this embodiment, the Tx power amplifier (PA) mode switch 690 of the Tx PA 668 is closed. As a result, stimulus signals no longer have a direct path (i.e., through Tx switch 604). Accordingly, such self-generated stimulus signals flow into the switchplexer 602 through the first 626 bypass test port. Likewise, stimulus signals are passed to the power combiner/divider 620 by the enhanced switch software (SW) control module 642 concurrently closing the first 624 bypass switch and opening the second 628 bypass termination shunt switch. Likewise, a proportion of a Tx stimulus signal passing to the power divider 620 is present at power tap 636 and is likewise simultaneously at broadband receiver test port 618. Likewise, the signal at the broadband receiver test port 618 can also be considered to be measurable and can be calibrated. Accordingly, signal at the antenna power tap port 636 is present on the incident signal path with closure of the antenna port power tap switch 634, thereby producing a proportional signal voltage present at the antenna test port 638.

Accordingly, the stimulus signal voltage present at the antenna test port 638 is accordingly present at the antenna port 646, where it is terminated into a nominal impedance and can be measured as power. Likewise, a proportional amount of signal present on the combiner/divider 620 is also present at a bidirectional antenna switched power tap port 636 and broadband receive test port 618. In this and other embodiments, the resulting stimulus signals can then be used to perform calibration operations.

The stimulus signal voltage on the incident signal path is simultaneously present at the Rx test port 612 as a result of the closure of the Rx switch 610 by the enhanced switch SW control module 642. Accordingly, measurements corresponding to the detected self generated stimulus signals at the Rx test port 612 are said to be self-tested and can be compared to measurements corresponding to the stimulus signals at the antenna port 646 performed during calibration and de-embedding operations known to those of skill in the art. In this and other embodiments, the calibration operations may be performed with the power sensor 652. Likewise, the self test, calibration and de-embedding operations may be performed in these various embodiments asynchronously with the detection, and measurement, of the aforementioned stimulus signals at the Rx test port 612.

Figure 9:
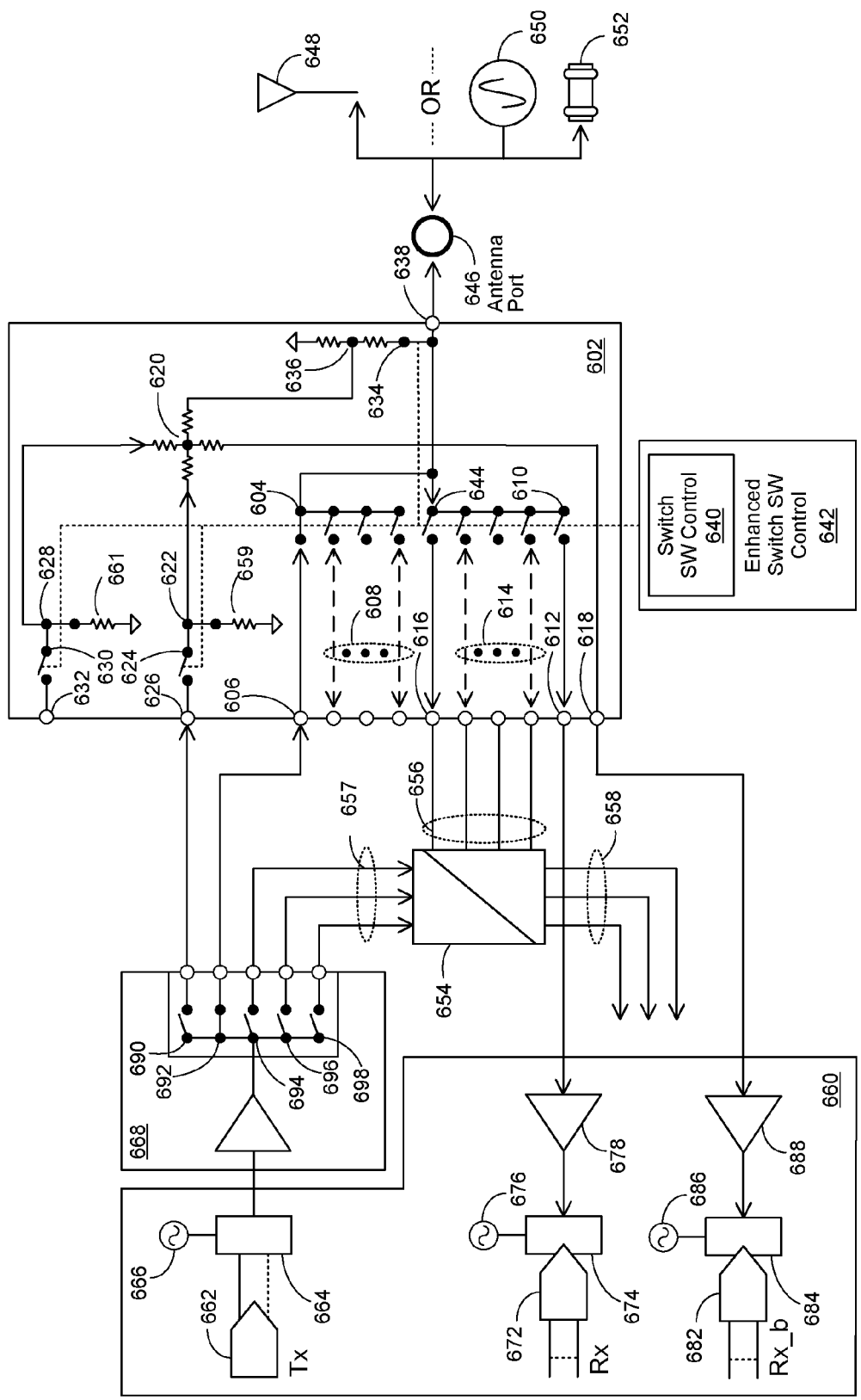
FIG. 9 is a simplified block diagram of a UE radio transceiver front end and switchplexer as used to perform broadband receiver transmit band calibration operations by using a transmit signal generated by the device under test as a source for Tx and other stimulus signals.

FIG. 9 is a simplified block diagram of a switchplexer as implemented in accordance with an embodiment of the disclosure to perform broadband receiver self-test and calibration operations by using a self generated stimulus signal, generated by the device under test as a source for transmitter (Tx) band and other stimulus signals. In this embodiment, the Tx power amplifier (PA) mode switch 692 of the Tx PA 668 is closed, such that Tx-generated stimulus signals flow into the switchplexer 602 via Tx port 606 and Tx switch 604. Accordingly, they are passed through the antenna test port 638 and simultaneously presented on the antenna port 646 and the antenna port power tap switch 634. Likewise, a proportion of this self generated stimulus signal is tapped by the closure of the antenna port power tap switch 634 by the enhanced switch software (SW) control module 642. Concurrently, the enhanced switch SW control module 642 opens the Rx switch 610, 624, and closes 622. As a result, the tapped Tx stimulus signals do not flow through live-air receiver (Rx) port 612, instead, signal flows to the combiner/divider 620, and from there, a proportional signal flows to the broadband Rx test port 618.

Accordingly, measurements corresponding to the tapped stimulus signals detected at the broadband test port 618 can be compared to measurements corresponding to the stimulus signals at the antenna port 646 to perform calibration and de-embedding operations known to those of skill in the art. In this and other embodiments, the calibration operations may be performed with the signal generator 650 or power sensor 652. Likewise, the self test, calibration and de-embedding operations may be performed in these various embodiments asynchronously with the detection, and measurement, of the aforementioned tapped stimulus signals at the broadband test port 618. Skilled practitioners of the art will recognize that the tapped Tx stimulus signals detected and measured at the broadband test port 618 may be used to fine tune radio's transmitter performance of the device under test 660 in non-manufacturing (e.g., field) conditions.

Figure 10:
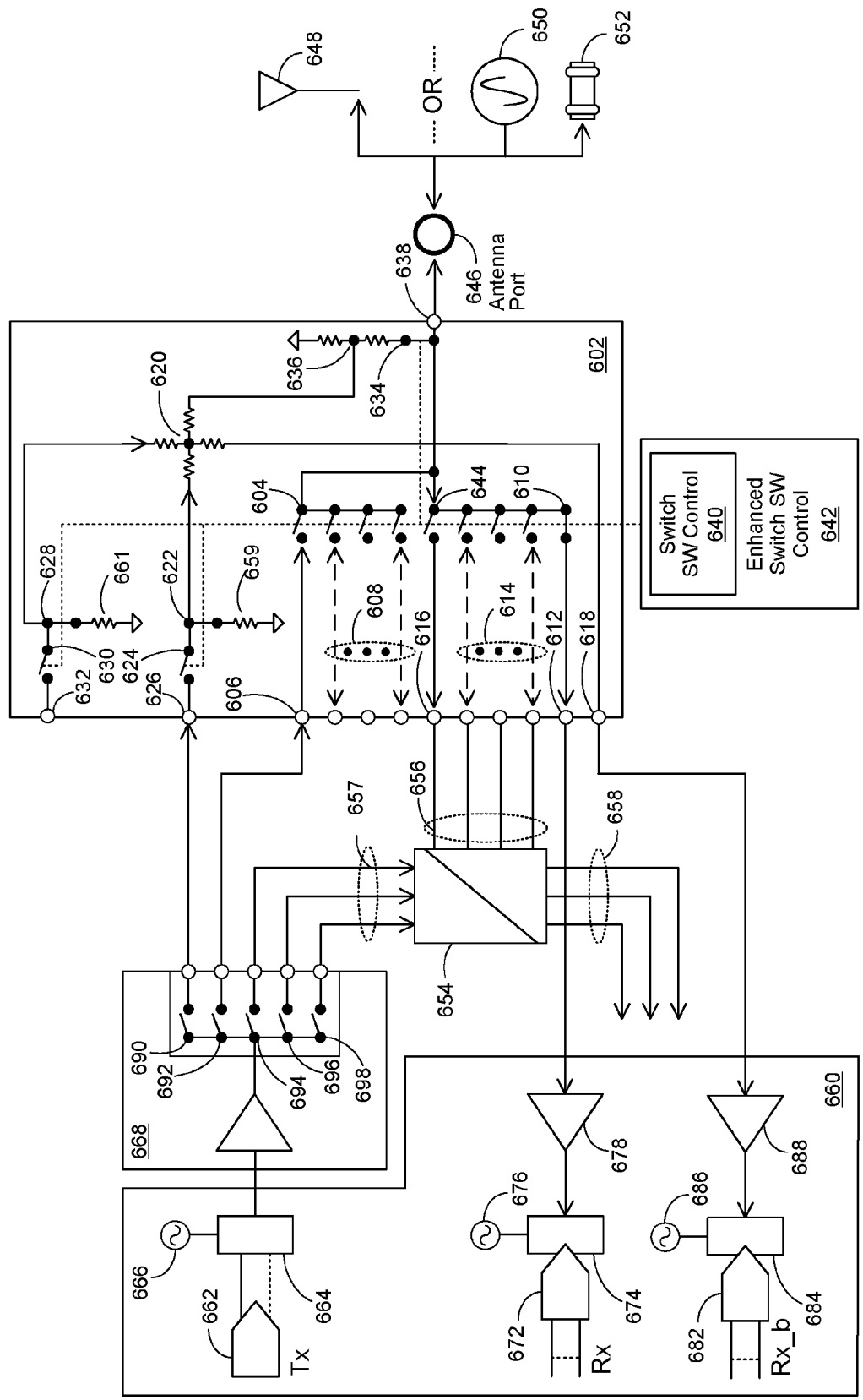
FIG. 10 is a simplified block diagram of a UE radio transceiver front end and switchplexer as used to perform broadband self-test calibration operations through the receipt of a signal with known characteristics in the receive band or the transmit band.

FIG. 10 is a simplified block diagram of a switchplexer as implemented in accordance with an embodiment of the disclosure to perform broadband self-test calibration operations through the receipt of a signal with known characteristics in the receive band and the transmit band. In various embodiments, the signal with known characteristics may be associated with transmitter (Tx), receiver (Rx), or other frequency bands. In this embodiment, a signal of known characteristics flows into the switchplexer 602 via antenna port 646. From there, signal is passed to the antenna test port 638, and on to the antenna port power tap switch 634. Accordingly, a proportional amount of incident signal is tapped by the closure of the antenna port power tap switch 634 by the enhanced switch software (SW) control module 642. Concurrently, tapped signal flows through the antenna port power tap switch 634, on to the combiner/divider 620, and from there a proportional signal is passed to the broadband Rx test port 618 as a tapped signal of known characteristics. Concurrently, the enhanced switch SW control module 642 opens the Tx switch 604 while closing the Rx switch 610 and the first 622 and second 628 bypass power tap termination shunt switches. As a result, the signal of known characteristics signals does not flow through the Tx test port 606. Instead, it flows directly through the Rx switch 610 and on to the Rx test port 612 as an untapped signal of known characteristics. In this and other embodiments, the signal of known characteristics may comprise frequencies not associated with Tx or Rx frequency bands typically associated with the device under test 660.

Measurements corresponding to the tapped signal of known characteristics detected at the broadband test port 618 can be compared to measurements corresponding to the signal of known characteristics at the antenna port 646 to perform calibration and de-embedding operations known to those of skill in the art for calculating calibration or path-wise de-embedding offset values. In this and other embodiments, the calibration operations may be performed with the signal generator 650. Likewise, the calibration operations may be performed in these various embodiments asynchronously with the detection, and measurement, of the aforementioned tapped signal of known characteristics at the broadband test port 618. Skilled practitioners of the art will recognize that the tapped signal of known characteristics detected and measured at the broadband test port 618 may be used to capture channel performance measurements related to the device under test 660 in situ under field conditions. Likewise, these same skilled practitioners will recognize that the channel frequency bands are not limited to in-band signals.

Figure 11:
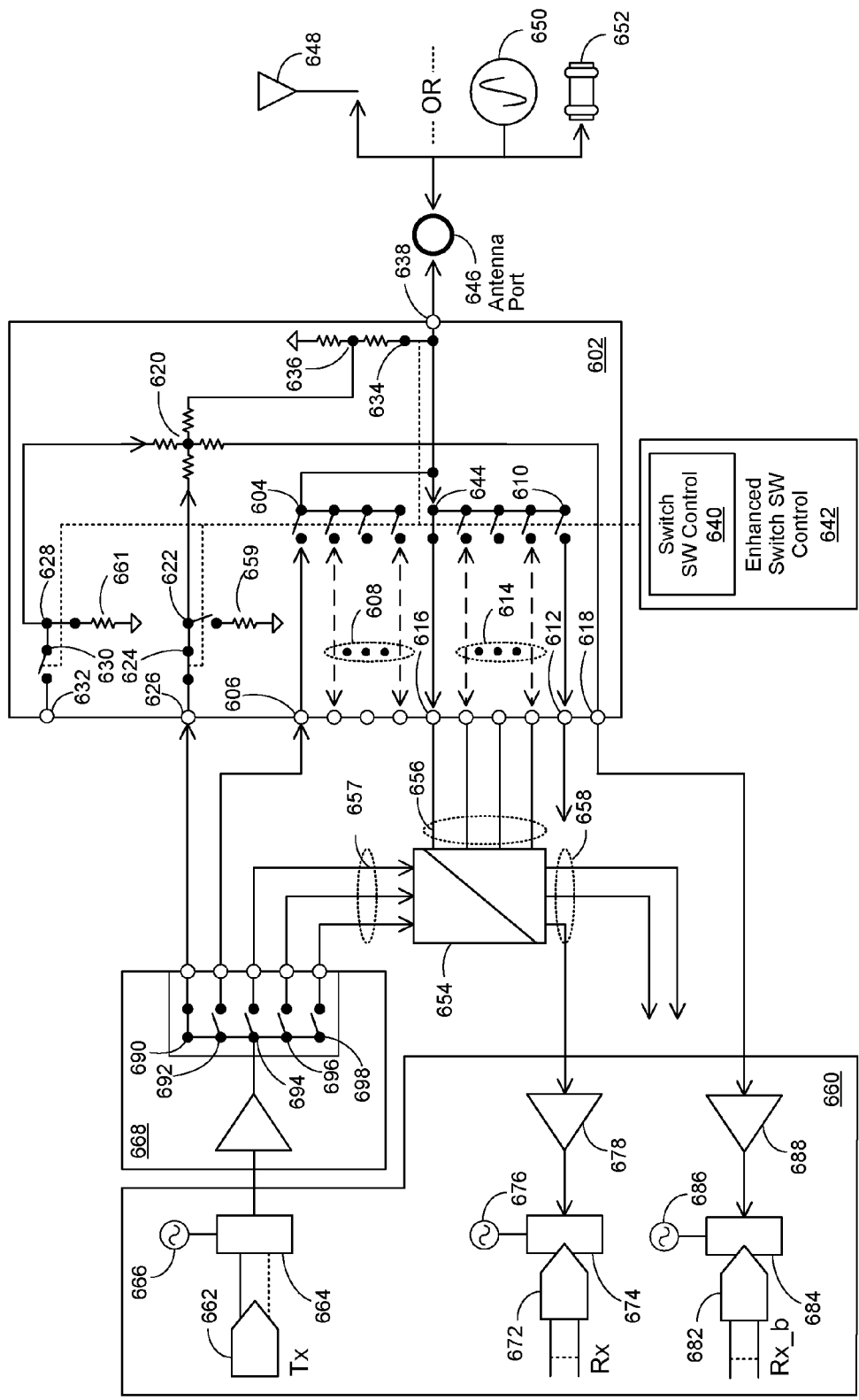
FIG. 11 is a simplified block diagram of a UE radio transceiver front end and switchplexer as used to perform live-air and broadband receiver self-test and calibration operations by bypassing a duplexer to provide a self-generated receive band stimulus signal.

FIG. 11 is a simplified block diagram of a switchplexer as implemented in accordance with an embodiment of the disclosure to perform live-air and broadband receiver self-test and calibration operations by bypassing a duplexer to provide a self-generated receive band stimulus signal. In this embodiment, the receipt of a transmitter (Tx) generated stimulus signal operating in a receive band by the switchplexer 602 is blocked by the duplexer's 654 Tx input ports 657. Skilled practitioners of the art will be aware that a duplexer 654 is typically used to restrict the flow of Tx frequencies to a predetermined band of frequency values from its input ports 657 to its common port 656. Also, these same skilled practitioners are aware that a duplexer 654 will permit signals present on the common ports 656 restricted to the receive bands to pass to the receive output ports 658. As shown in FIG. 11, these tapped Tx signals are passed via PA mode switch 690 to bypass test port 626 and onto the combiner/divider 620 via closure of switch 624 by the enhanced switch software (SW) control module 642. Likewise, switch 622 is open and does not permit signal to flow to the termination shunt resistor 659 and 661. Likewise, the signal present at the combiner/divider 620 is passed to the power tap port 636 and to the incident signal path via closure of switch 634. Here the signal is voltage divided and likewise is present on both the antenna test port 638 to be simultaneously presented on the antenna port 646 and via closure of switch 644 at the Rx test port 616. Likewise, signal on the incident signal path is passed to the duplexer's 654 common port 656 receives signal coupled from the duplexer Rx test Port 616. Switch control is provided by the enhanced switch SW control module 642. Likewise, signal passes through the antenna test port 638 to the antenna port 646. Concurrently, the self-generated stimulus signals are passed through the combiner/divider 620 and on to the broadband Rx test port 618 as a voltage divided Rx band stimulus signal. In the context of a transceiver architecture that uses a duplexer, the receive port 610 is not used, rather the transmitter switch 644 as shown in this simplified switchplexer diagram is used for both transmit and receive functions. The Rx switch 610 is open. Likewise, tapped signal passing the duplexer 654, filtered and present on duplexer output ports 658 are passed in this exemplary drawing to a live-air low noise amplifier (LNA) 678. In this and previous embodiments the signal follows the same method of detection at the DUT 660.

Measurements corresponding to the tapped Rx signals detected at the broadband test port 618 or live-air Rx can be compared to measurements corresponding to the Rx signals at the antenna port 646 to perform calibration and de-embedding operations known to those of skill in the art. In this and other embodiments, the calibration operations may be performed with the signal generator 650 or power sensor 652. Likewise, the calibration operations may be performed in these various embodiments asynchronously with the self test detection, and measurement, of the aforementioned tapped received stimulus signal at the live-air LNA port 678 and broadband test port 618. In this and other embodiments, the tapped stimulus signals feeding to the broadband receiver may comprise frequencies not associated with Tx or Rx frequency bands typically associated with the device under test 660, an example of this is where the device under test in operational mode is not required to operate at these frequencies, but in self test mode it may be required to have different frequencies of operation beneficial self test and field applications.

Figure 12:
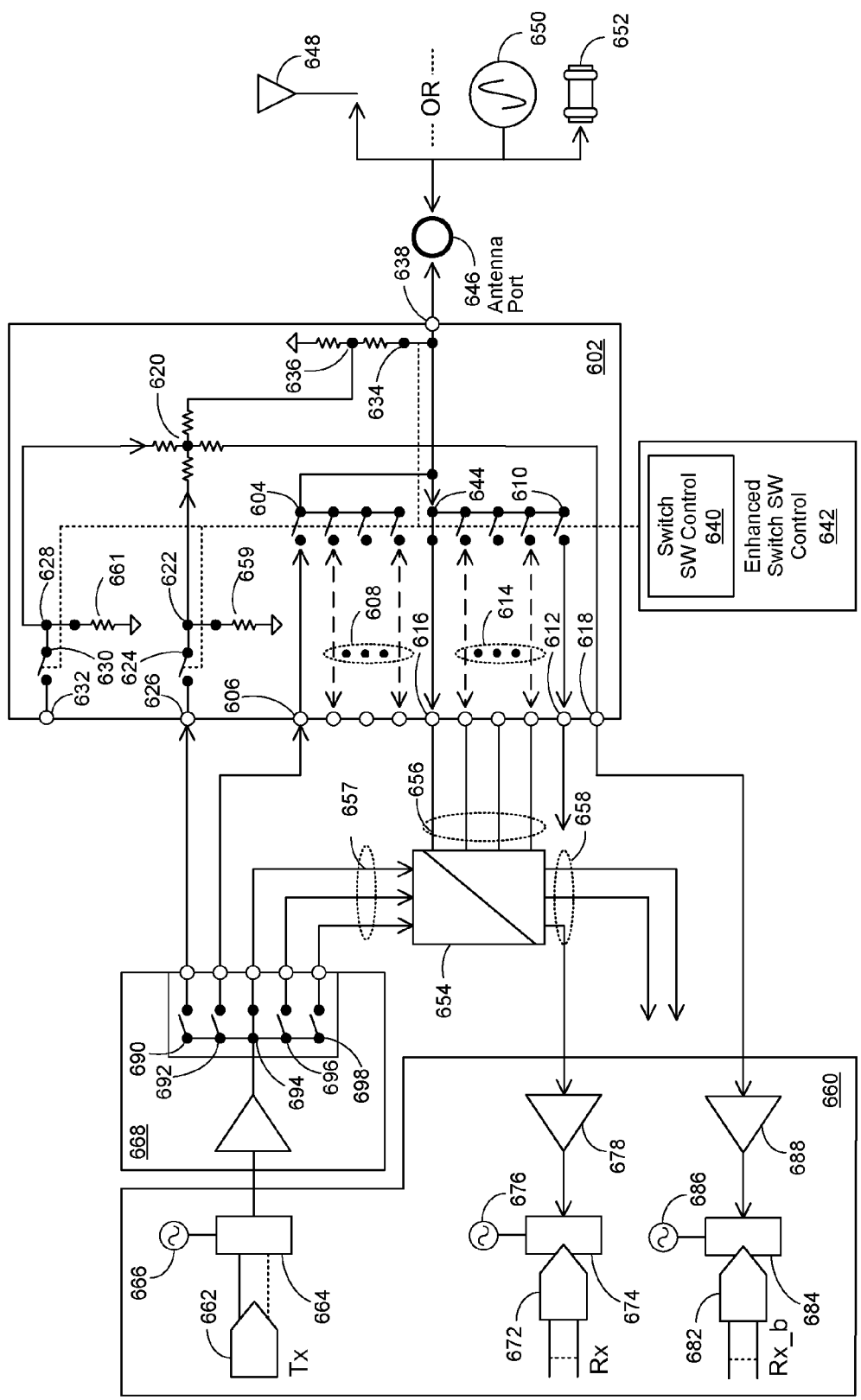
FIG. 12 is a simplified block diagram of a UE radio transceiver front end and switchplexer as used to perform broadband receiver self-test operations and calibration operations by monitoring a receive or transmit frequency band signal.
Figure 13A:
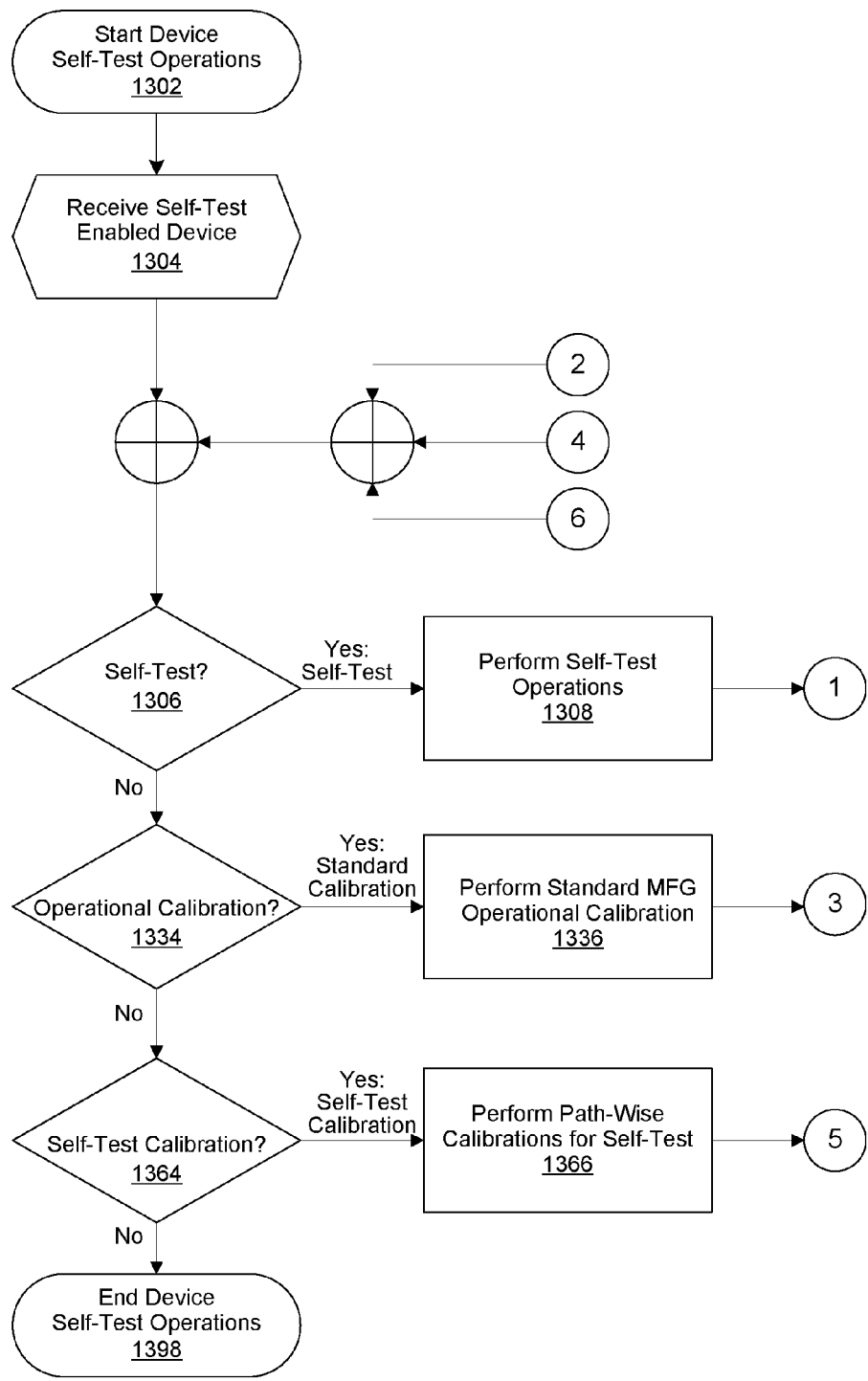
FIGS. 13a-d are generalized flowcharts of device self-test and calibration operations.
Figure 13B:
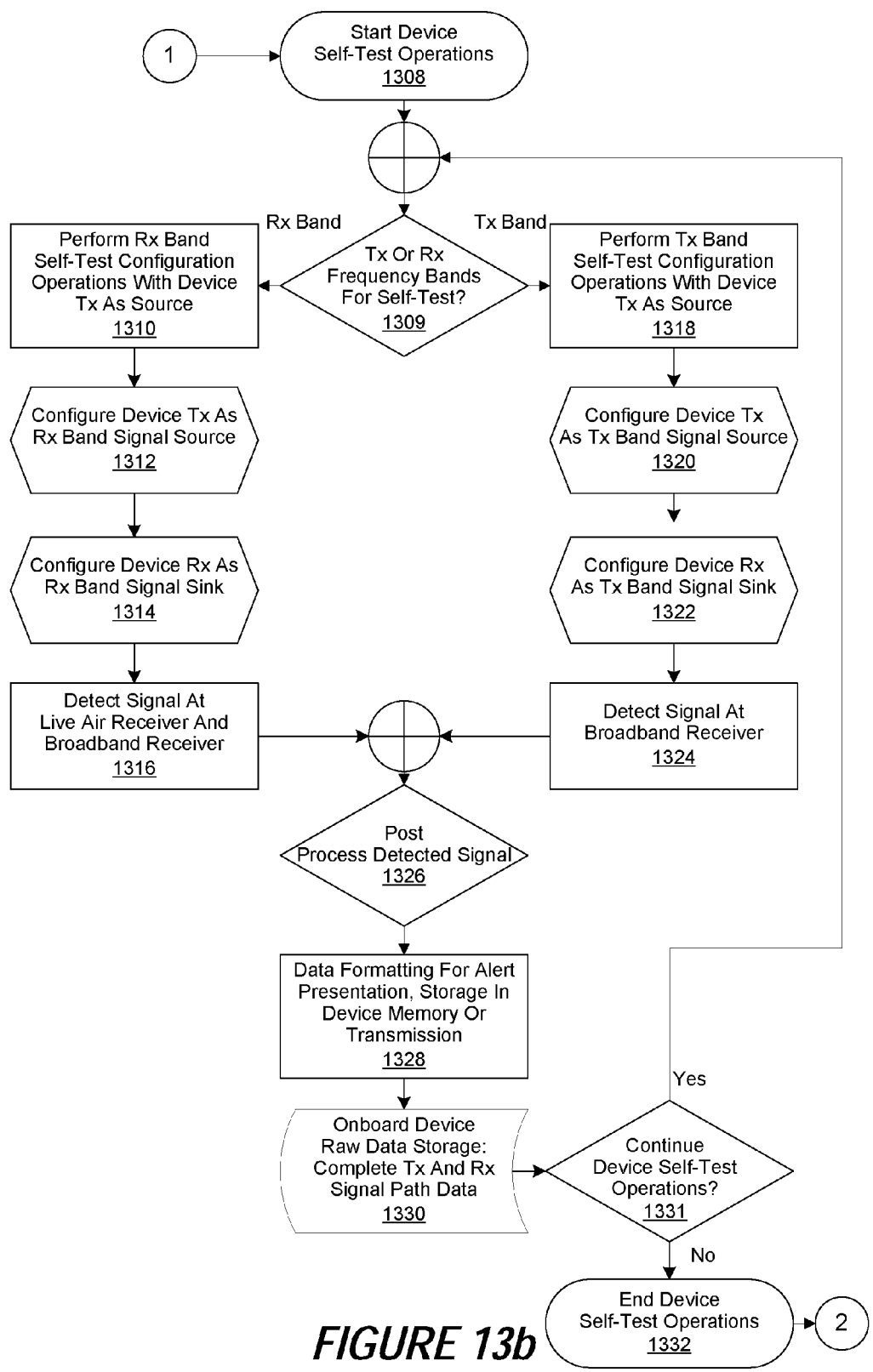
Figure 13C:
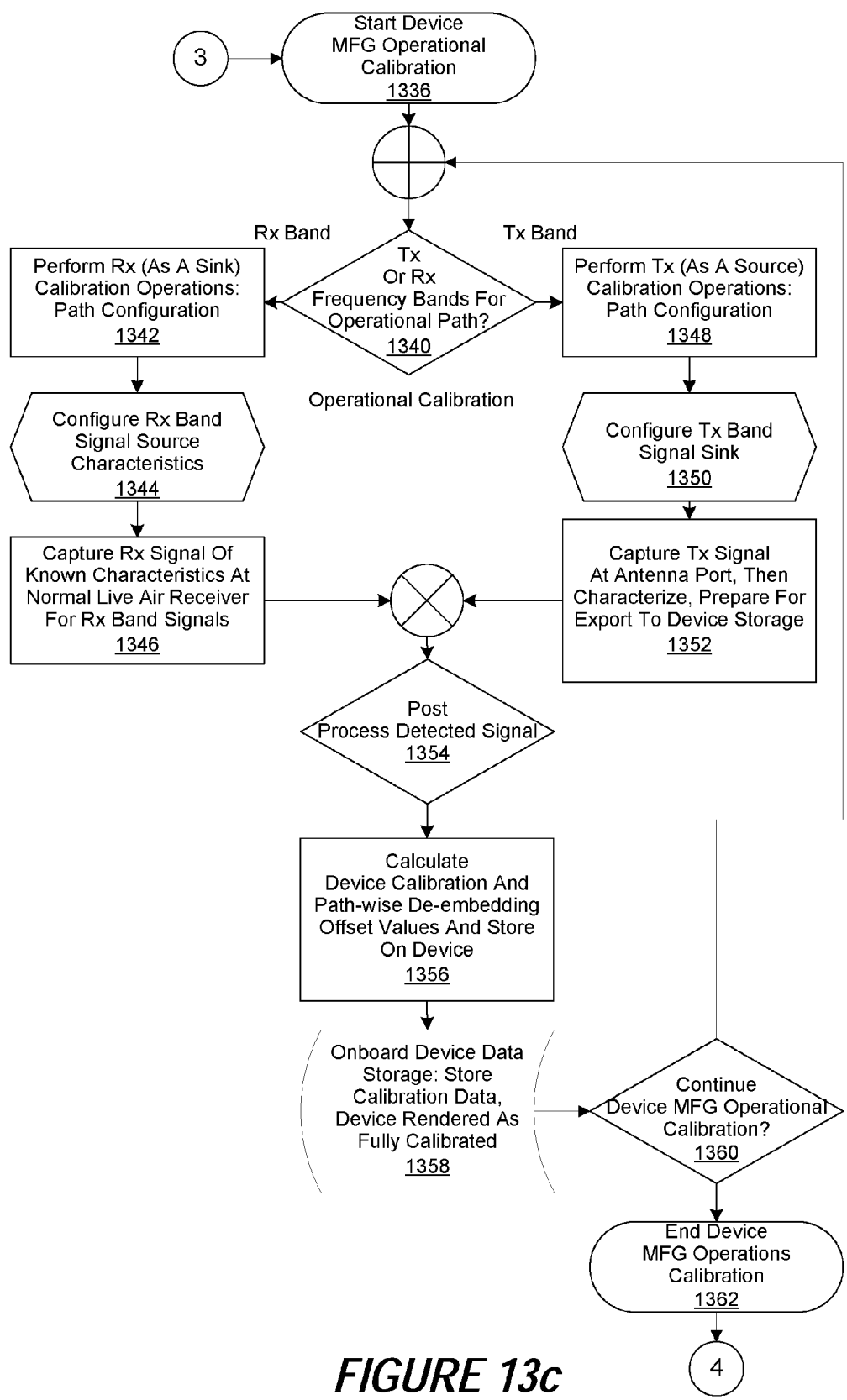
Figure 13D:
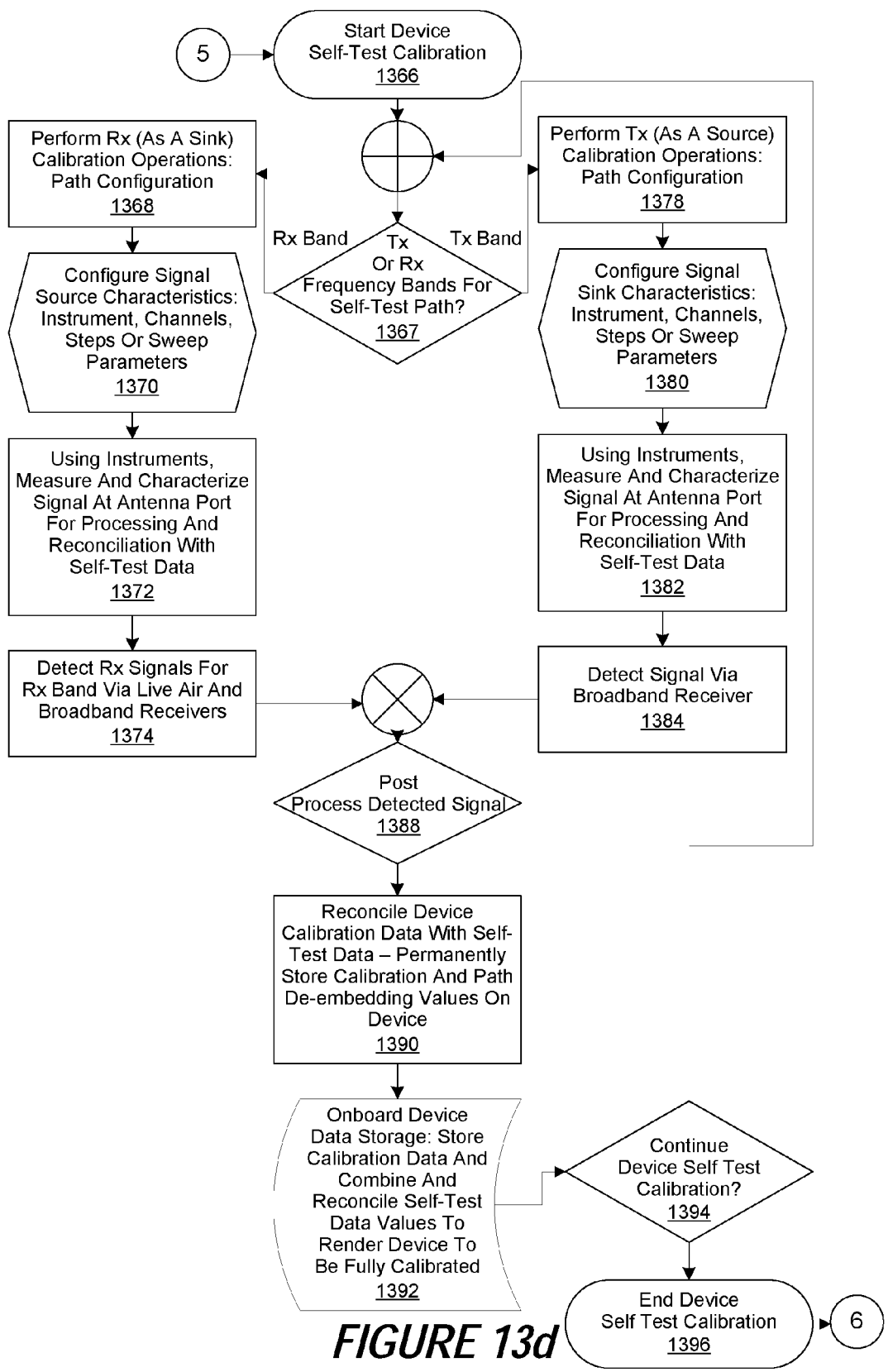

FIG. 12 is a simplified block diagram of a switchplexer as implemented in accordance with an embodiment of the disclosure to perform broadband receiver self-test and calibration operations by monitoring a receive or transmit frequency band signal. In this embodiment, a self-generated stimulus signals flow from duplexer 654 from the Tx input port 657 exiting the duplexer via the common ports 656 into the switchplexer 602 via port 616 and switch 644. From there, they are passed through the antenna test port 638 and simultaneously presented on the antenna port 646 and power tap port 636, where they are tapped by the closure of the antenna port power tap switch 634 by the enhanced switch software (SW) control module 642. Concurrently, the enhanced switch SW control module 642 closes switches to the shunt resistors 659 and 661 while opening the bypass port switch 630, 624 and the receiver (Rx) switch 610. As a result, the signal flow is passed through the combiner/divider 620 and then to the broadband Rx test port 618 as a tapped signal. In various embodiments, the stimulus signal may be received from the antenna 648, the signal generator 650, or measured via the power sensor 652 if self-generated. In this and other embodiments, the received signal may comprise frequencies not associated with Tx or Rx frequency bands typically associated with the device under test 660.

Measurements corresponding to the tapped signals detected at the broadband test port 618 can be compared to measurements corresponding to the signals at the antenna port 646 to perform calibration and de-embedding operations known to those of skill in the art. In this and other embodiments, the calibration operations may be performed with the signal generator 650 or power sensor 652. Likewise, the calibration operations may be performed in these various embodiments asynchronously with the self-test detection, and measurement, of the aforementioned tapped signal at the broadband test port 618. In this and other embodiments, the tapped signals may comprise frequencies not associated with Tx or Rx frequency bands typically associated with the device under test 660. Skilled practitioners of the art will recognize that the tapped signal detected and measured at the broadband test port 618 may be used to capture channel performance, interfering signal, or onboard spectral analysis measurements related to the device under test 660 in situ under field conditions. Likewise, these same skilled practitioners will recognize that the frequency bands are not limited to in-band frequencies.

FIGS. 13*a*-*d* are a generalized flowchart of device method for self test, self test calibration, and operational calibration as performed in accordance with the embodiment of the disclosure. Self test in this embodiment is defined as a method of test where signals are generated and detected internally by the device under test itself. Likewise, calibration of these internally generated signals or internal path-wise losses thereof are a necessary operation well known to skilled practitioners of the art of RF testing. Operational calibration in this embodiment refers to a typical standard method of calibration independent of self test and self test calibration and is not perturbed in this embodiment but is included here as an exemplary method that remains unaffected by the embodiment of the present disclosure.

In this embodiment, device self-test operations begin in step 1302, followed by the receipt of a self-test enabled device in manufacturing in step 1304. A determination is then made in step 1306 whether to self test the device in step 1308 or not to self-test the device and proceed to the next step 1334. In various embodiments, self-test, and manufacturing operational calibration operations or self test calibration steps, are not required to be performed in the traditional sequence of combined manufacturing calibration and manufacturing test or validation. Instead, since the test platform is the device under test itself, and it is not subject to the variations found in a traditional factory calibration and test setting, those skilled in the art will recognize that order is no longer important. Furthermore, calibration is not limited to the generation of calibration offset values but also includes the process of de-embedding the calibration values from self-test values to provide a database of offset values used to correct for all self-test values.

If it is determined in step 1306 that the self-test setup request is for a device self-test, then a determination is made in step 1308 to begin self test. In step 1309 a determination is made whether the device self-test will be performed for the device's transmitter (Tx) or receiver (Rx) frequency bands. If it is determined in step 1309 that the device's Rx frequency bands are to be self-tested, then the device's transmitter is used in step 1310 as the signal source to perform Rx frequency band self-test configuration operations as described in greater detail in the descriptive text associated with FIGS. 8 and 11. The device's transmitter is then configured as the Rx signal source for the frequency band test in step 1312. The signal may be said to be self-generated as it is generated on-board the device under test, such as a user equipment (UE) device. In this and various other embodiments, the characteristics of a signal source (or sources) may comprise one or more frequency bands, one or more radio channels, one or more power levels, and one or more steps or sweep parameters. The device's receiver is then configured as the Rx signal sink for the Rx frequency band test in step 1314. In this and various other embodiments, the Rx signal sink may comprise one or more frequency bands, one or more radio channels, and one or more steps or sweep parameters. Those of skill in the art will recognize that many such Rx signal source and sink configurations are possible and the foregoing is not intended to limit the spirit, scope, or intent of the disclosure. Once the Rx signal source and signal sink configurations are completed in steps 1312 and 1314, signal detection operations are performed in step 1316 to detect a signal by both the device's live air and broadband receivers.

However, if it is determined in step 1309 that the device's Tx frequency bands are to be self-tested, then the device's transmitter is used in step 1318 to perform Tx frequency band self-test configuration operations as described in greater detail in the descriptive text associated with FIGS. 9, 10, and 12. The device's transmitter is then configured as the Tx signal source for the Tx frequency band test in step 1320. In this and various other embodiments, the Tx signal source may comprise one or more transmitters combined at a signal combiner, one or more frequency bands, one or more radio channels, one or more power levels, and one or more steps or sweep parameters. The device's receiver is then configured as the Tx signal sink for the Tx frequency band test in step 1322. In this and various other embodiments, the Tx signal sink may comprise one or more frequency bands, one or more radio channels, and one or more steps or sweep parameters. Those of skill in the art will recognize that many such Tx signal source and sink configurations are possible and the foregoing is not intended to limit the spirit, scope, or intent of the disclosure. Once the Tx signal source and signal sink configurations are completed in steps 1320 and 1322, signal detection operations are performed in step 1324 to detect a signal by the device's broadband receiver.

Once signal detection operations have been completed in either step 1316 or 1324, in step 1326 data is post processed and a determination is made whether digital signals used in the self-test operations will be processed by a CPU, an Application-Specific Integrated Circuit (ASIC), processed by an algorithm, or passed to the device's Direct Memory Access (DMA) channel. In these various embodiments, the algorithms may perform convolution, correlation, comparison, Fast Fourier Transform (FFT), filtering, and spectral analysis operations. Skilled practitioners of the art will recognize that many such post processing operations are possible and the foregoing is not intended to limit the spirit, scope, or intent of the disclosure.

Once the self-test operations are completed in step 1326, data formatting is performed on Rx or Tx raw self-test data in step 1328 for alert presentation, storage within the device under test, or for transmission in step 1330. A determination is then made in step 1331 whether to continue device self-test operations. If so, the process is continued, proceeding with step 1309. Otherwise, device self-test operations are ended in step 1332.

However, if it is determined in step 1306 that calibration operations are to be performed, then a determination is made in step 1334 whether or not to choose a standard manufacturing operational calibration process. As described in greater detail herein, the current embodiment is not detectable if the switched power tap is not enabled and therefore the UE radio front end and antenna switch module behavior is for all practical purposes unchanged from traditional designs of this nature. If it is determined in step 1334 that a standard manufacturing operational calibration is chosen, step 1336 initiates this process. For standard manufacturing operational calibration, then a determination is made in step 1340 whether the operational path for calibration will be performed for the device's transmitter (Tx) or receiver (Rx) frequency bands. If it is determined in step 1340 that the device's Rx frequency bands are to be configured in the operational path, then Rx (as a signal sink) frequency band configuration operations are performed in step 1324 as described in greater detail in the descriptive text associated with FIG. 6. The signal source characteristics for the Rx frequency bands are then configured in step 1344. In this and various other embodiments, the Rx signal source characteristics may comprise one or more frequency bands (Rx or Tx), one or more instruments, such as those that are National Institute of Standards and Technology (NIST) traceable, and one or more steps or sweep parameters. The signal strength of known characteristics of the Rx frequency bands is then detected by the device's live air receiver in step 1346.

However, if it is determined in step 1340 that the device's Tx frequency bands are to be configured in the operational path, then Tx (as a signal source) frequency band configuration operations are performed in step 1348 as described in greater detail in the descriptive text associated with FIG. 7. The signal sink configured to receive signals with characteristics for the Tx frequency bands (as a signal sink) are then configured in step 1350. In this and various other embodiments, the Tx signal source characteristics may comprise one or more transmitters, one or more frequency bands (Tx or Rx), and sinks may comprise of one or more instruments, such as those that are National Institute of Standards and Technology (NIST) traceable (e.g., power detector, call box, or spectrum analyzer, etc.), and one or more steps or sweep parameters. The Tx signal is then captured and detected using traditional instruments at the device's antenna port in step 1352.

Once the Rx or Tx operational paths' calibration signals have been respectively captured at steps 1346 or 1352, in step 1354 data is post processed and calibration values calculated and processed by a CPU. Skilled practitioners of the art will recognize that many typical calibration processing operations are possible and the foregoing is not intended to limit the spirit, scope, or intent of the disclosure. Once the self-test operation paths' calibrations are completed in steps 1354, data reconciliation operations are performed between the operational paths' calibration data and self-test data, the results of which are then stored as calibration and path-wise de-embedding offset values on the device under test or persistent on a network accessible by the device under test in step 1356. Then, in step 1358, the operational paths' calibration data generated in steps 1356 are stored in the device under test, such as a user equipment (UE) device, and then combined and affiliated with raw self-test data values and once stored, to render the device fully calibrated. A determination is then made in step 1360 whether to continue device calibration operations. If so, the process is continued, proceeding with step 1340. Otherwise, device self-test operations are ended in step 1362.

However, if it was determined in step 1334 not to perform standard manufacturing operational calibrations, the flow proceeds to step 1364. Then a determination is made in step 1364 whether the self-test path-wise calibration will be performed. If yes, then step 1366 is initiated. A determination is made at step 1367 to calibrate either for the device's transmitter (Tx) or receiver (Rx) frequency bands. If it is determined in step 1367 that the device's Rx frequency bands are to be configured in the self-test path, then Rx (as a signal sink) frequency band calibration and de-embedding operations are performed in step 1368 as described in greater detail in the descriptive text associated with FIGS. 8, 10, and 11. The signal source characteristics for the Rx frequency bands are then configured in step 1370. In this and various other embodiments, the Rx signal source characteristics may comprise one or more frequency bands (Rx or Tx) or channels, one or more instruments, such as those that are NIST-traceable, and one or more steps or sweep parameters. The Rx frequency signals are then measured and characterized at the device's antenna port in step 1372 for processing and reconciliation with self-test data described in greater detail herein. Then, in step 1374, the Rx frequency band signal flows are detected by both the device's live air and broadband receivers.

However, if it is determined in step 1367 that the device's Tx frequency bands are to be configured in the self-test path, then Tx (as a signal source) frequency band self-test calibration operations are performed in step 1378 as described in greater detail in the descriptive text associated with FIGS. 9, 10, and 12. The signal source characteristics for the Tx frequency bands are then configured in step 1380. In this and various other embodiments, the Tx signal source characteristics may comprise one or more frequency bands (Rx or Tx) or channels, and one or more steps or sweep parameters. The Tx frequency band signals are then measured and characterized at the device's antenna port in step 1382 for processing and reconciliation with self-test data described in greater detail herein. Then, in step 1384, the Tx frequency signal flows are detected by the device's broadband receiver.

Once the detection of both Rx and Tx frequency band signals has been completed in either steps 1374 or 1384, in step 1388 data is post processed and a determination is made whether digital signals used in the self-test operations will be processed by a CPU, an Application-Specific Integrated Circuit (ASIC), processed by an algorithm, or passed to the device's Direct Memory Access (DMA) channel. In these various embodiments, the algorithms may perform convolution, correlation, comparison, Fast Fourier Transform (FFT), filtering, and spectral analysis operations. Skilled practitioners of the art will recognize that many such post processing operations are possible and the foregoing is not intended to limit the spirit, scope, or intent of the disclosure.

Once the self-test calibration operations are completed in step 1388, data comparison operations are performed between the self-test calibration data and self-test data, the results of which are then calculated as calibration and path de-embedding offset values in the device under test in step 1390. Then, in step 1392, the calibration data generated in step 1390 is stored in the device under test and then combined and affiliated with raw self-test data values to render the device fully self-test calibrated. A determination is then made in step 1394 whether to continue device self-test calibration. If so, the process is continued, proceeding with step 1367. Otherwise, device self-test operations are ended in step 1396.

Figure 14A:
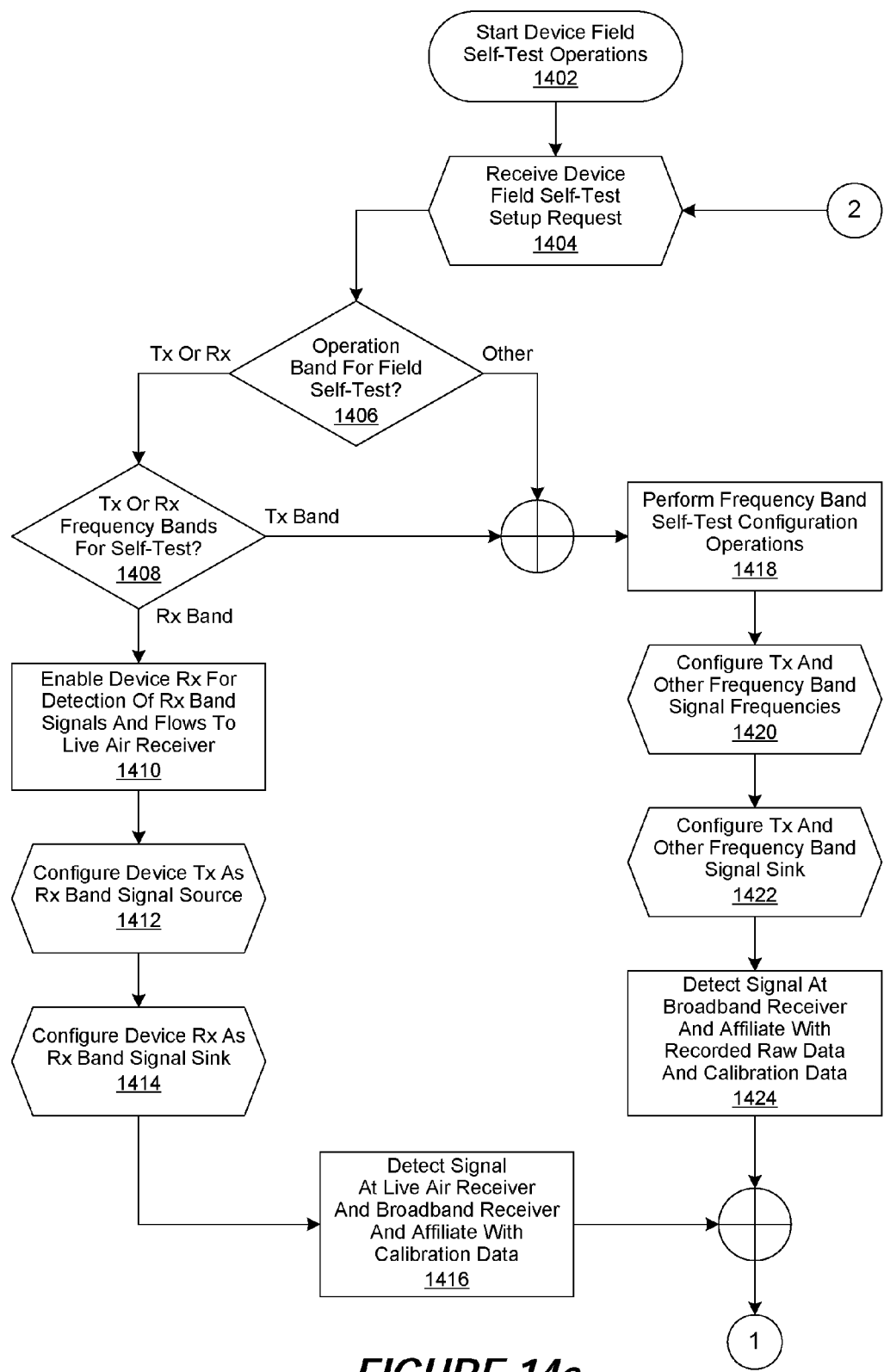
FIGS. 14a-b are generalized flowcharts of device field self-test operations.
Figure 14B:
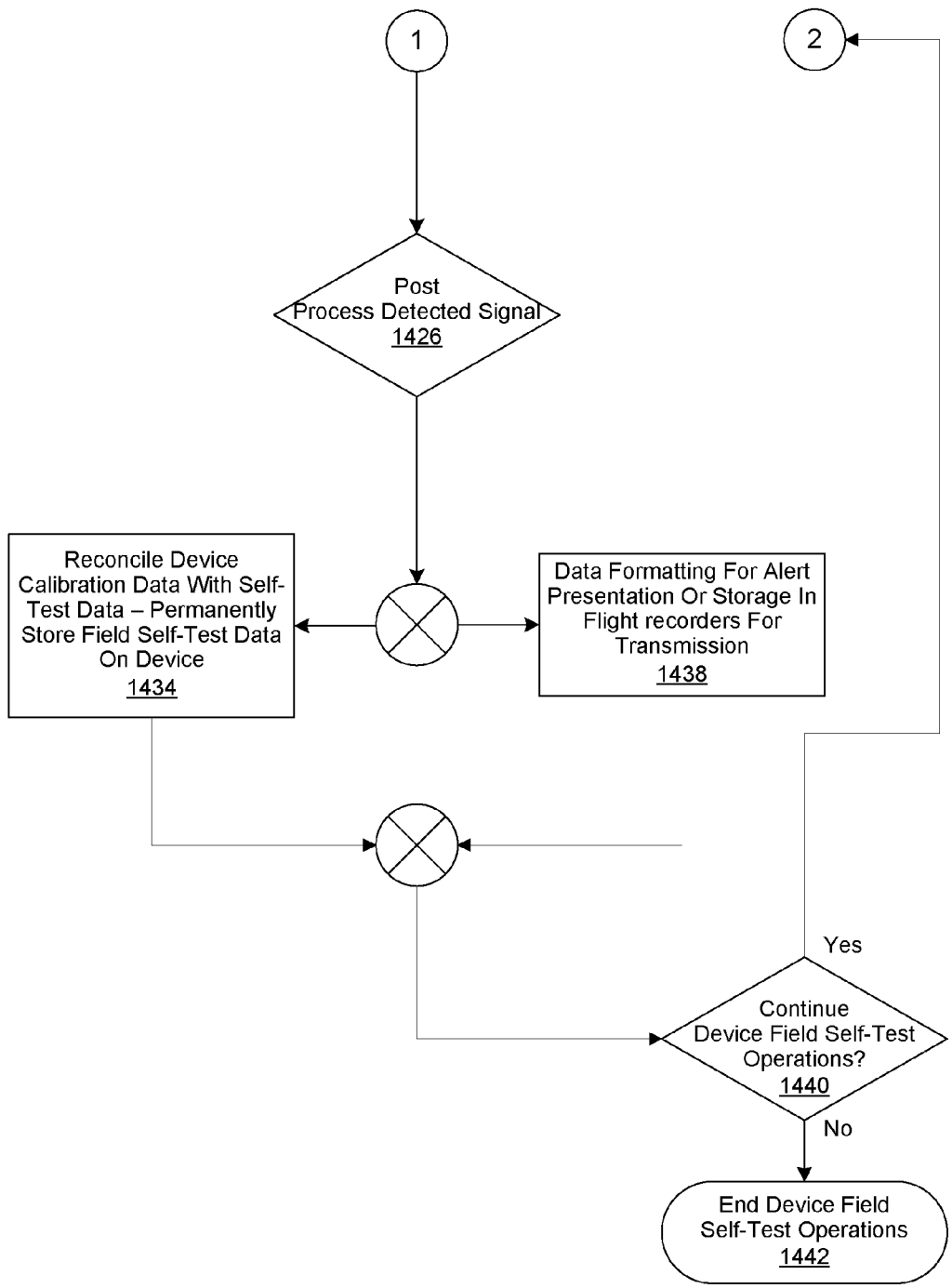

FIGS. 14*a-b* are a generalized flowchart of device field self-test operations performed in accordance with an embodiment of the disclosure. In this embodiment, device self-test operations performed in the field begin in step 1402, followed by the receipt of a device self-test setup request in step 1404 either internally generated on the UE or received from a remote network by the UE. A determination is then made in step 1406 whether the self-test setup request is for transmitter (Tx) or receiver (Rx), or for other frequency bands. If it is determined in step 1406 that the request is for Rx or Tx frequency bands, then a determination is made in step 1408 whether the self-test operations are for the device's Rx or Tx frequency bands. If it is determined in step 1408 that the device's Rx frequency bands are to be self-tested, then the device's receiver is enabled in step 1410 to perform Rx frequency band signal and signal flow detection operations as described in greater detail in the descriptive text associated with FIGS. 8, 10, and 11.

The signal source for the Rx frequency band test is then configured in step 1412. In this and various other embodiments, the Rx signal source may comprise the antenna port, or one or more onboard self-generated transmitter signals, one or more frequency bands, one or more radio channels, one or more power levels, and one or more steps or sweep parameters. The signal sink for the Rx frequency band test is then configured in step 1414. In this and various other embodiments, the Rx signal sink may comprise one or more frequency bands, one or more radio channels, and one or more steps or sweep parameters. Those of skill in the art will recognize that many such Rx signal source and sink configurations are possible and the foregoing is not intended to limit the spirit, scope, or intent of the disclosure. Signal detection operations are then performed in step 1416 with both the device's live air receiver and its broadband receiver and recording a detected stimulus as raw data, which are then affiliated with calibration and de-embedding offset values stored on the device under test.

However, if it is determined in step 1406 that the field self-test operations are for other frequency bands, or in step 1408 that the self-test is for Tx frequency bands, then signal and signal flow detection operations are performed in step 1418 for Tx and other frequency bands as described in greater detail in the descriptive text associated with FIG. 9, 10, or 12. The signal source for the frequency band test for Tx and other frequency bands is then configured in step 1420. In this and various other embodiments, the Tx and other frequency band signal sources may comprise one or more transmitter signals, one or more frequency bands, one or more radio channels, one or more power levels, and one or more steps or sweep parameters. The signal sink for the frequency band test for Tx and other frequency bands is then configured in step 1422. In this and various other embodiments, the Tx and other frequency band signal sink may comprise one or more frequency bands, one or more radio channels, and one or more steps or sweep parameters. Those of skill in the art will recognize that many such signal source and sink configurations for Tx and other frequency bands are possible and the foregoing is not intended to limit the spirit, scope, or intent of the disclosure. Signal detection operations are then performed in step 1424 with its broadband receiver and recording a detected stimulus as raw data, which are then affiliated with calibration and de-embedding offset values stored on the device under test.

Once the field self-test operations are completed in steps 1416 and 1424, step 1426 data is post processed and a determination is made whether digital signals used in the self-test operations will be processed by a CPU, an Application-Specific Integrated Circuit (ASIC), processed by an algorithm, or passed to the device's Direct Memory Access (DMA) channel. In these various embodiments, the algorithms may perform convolution, correlation, comparison, Fast Fourier Transform (FFT), filtering, and spectral analysis operations. Skilled practitioners of the art will recognize that many such post processing operations are possible and the foregoing is not intended to limit the spirit, scope, or intent of the disclosure.

Once the self-test operations are completed in step 1426, data reconciliation operations are performed between the calibration and de-embedding offset value data and self-test data, the results of which are then stored as field self-test test values in the device under test in step 1434. Alternatively, once the self-test operations are completed in step 1426, data formatting is performed on Rx or Tx self-test data in step 1438 for alert presentation or storage within the device under test. Thereafter, or after the storage operations are completed in step 1434, a determination is made in step 1440 whether to continue device self-test operations. If so, the process is continued, proceeding with step 1404. Otherwise, device self-test operations are ended in step 1442.

Although the described exemplary embodiments disclosed herein are described with reference to testing radio devices, the present disclosure is not necessarily limited to the example embodiments which illustrate inventive aspects of the present disclosure that are applicable to a wide variety of authentication algorithms. Thus, the particular embodiments disclosed above are illustrative only and should not be taken as limitations upon the present disclosure, as the disclosure may be modified and practiced in different but equivalent manners apparent to those skilled in the art having the benefit of the teachings herein. Accordingly, the foregoing description is not intended to limit the disclosure to the particular form set forth, but on the contrary, is intended to cover such alternatives, modifications and equivalents as may be included within the spirit and scope of the disclosure as defined by the appended claims so that those skilled in the art should understand that they can make various changes, substitutions and alterations without departing from the spirit and scope of the disclosure in its broadest form.

What is claimed is:

1. A switchplexer for performing test operations on a radio device, comprising:
   a plurality of test ports corresponding to a plurality of radio device ports;
   a plurality of switches comprising at least a transmitter switch and a receiver switch, the transmitter switch configured to allow testing via a transmitter path and the receiver switch configured to allow testing via a receiver path;
   a circuit operable to provide a test signal measurement value corresponding to the presence of a test signal at individual test ports of said plurality of test ports; and
   processing logic operable to actuate said plurality of switches to route said test signal between said individual test ports;
   wherein said test signal measurement values are used to perform self-test operations associated with at least a transmitter or a receiver of said radio device via the transmitter path or the receiver path, respectively.

2. The switchplexer of claim 1, wherein said plurality of radio device ports comprise at least one of the set of:
   a live-air radio transmitter test port operable to transmit said test signal;
   a live-air radio receiver test port operable to receive said test signal;
   an antenna port operable to transmit and receive said test signal;
   a broadband radio receiver test port operable to receive said test signal; and
   a bypass test port operable to transmit or receive said test signal.

3. The switchplexer of claim 2, wherein said switchplexer comprises an isolation switch coupled to a bypass port or ports operable to provide additional isolation to said test signal when said switch is in an OFF state.

4. The switchplexer of claim 2, wherein said switchplexer comprises a broadband power combiner/divider operable to combine or divide said test signal between a plurality of ports.

5. The switchplexer of claim 2, wherein said switchplexer comprises a switched power-tap operable to transmit and receive said test signal.

6. The switchplexer of claim 3, wherein said bypass port isolation switch is operably coupled to a port of said combiner/divider.

7. The switchplexer of claim 4, wherein said power combiner/divider is operably coupled to said broadband receiver test port.

8. The switchplexer of claim 5, wherein said power combiner/divider is operably coupled to said switched power-tap.

9. The switchplexer of claim 2, wherein said switched power-tap port is operable to be bidirectional and broadband to said transmit and receive test signals.

10. The switchplexer of claim 5, wherein said switched power-tap port is operable to avoid perturbation of the normal incident live-air transmit and receive signal in the disabled mode.

11. The switchplexer of claim 5, wherein said switched power-tap port is configured to minimally perturb the normal incident live-air transmit and receive signal in the enabled mode.

12. The switchplexer of claim 11, wherein said plurality of test ports comprise at least one of the set of:
   a live-air radio transmitter test port operable to provide said test signal to said live-air radio receiver port;
   a live-air radio receiver test port operable to receive said test signal from said live-air radio transmitter port;
   a broadband receiver test port operable to receive said test signal to said broadband radio receiver port;
   an antenna test port operable to transmit and receive said test signal to said antenna port; and
   a bypass port operable to transmit or receive said test signal to or from said antenna port.

13. The switchplexer of claim 1, wherein said switchplexer is combined with a device under test (DUT), wherein said test signal has a frequency within the transmit and/or receive frequency band of a radio module of said DUT.

14. The switchplexer of claim 1 comprising an antenna port capable of bidirectional signal flow in the transmit and/or receive band of a radio module of a DUT.

15. The switchplexer of claim 1 comprising a bypass port capable of bidirectional signal flow in the transmit and/or receive band of a radio module of a DUT.

16. The switchplexer of claim 1, wherein said switchplexer is combined with a DUT, wherein the test signal has a frequency outside the transmit and/or receive frequency band of said radio device.

17. The switchplexer of claim 1, wherein said radio device comprises processing logic operable to receive and detect characteristics of said test signal as it passes through at least one path of the set of:
   a transmit to live air receiver path via an antenna port;
   a transmit to broadband receiver path via an antenna port;
   a transmit to receiver path passing through a bypass circuit;
   a transmit to broadband receiver path passing through a bypass circuit;
   a path from an antenna port to a live air receiver; or
   a path from an antenna port to a broadband receiver.

18. The switchplexer of claim 17, wherein said processing logic is further configured to transfer radio device performance to a diagnostic server.

19. A computer-implemented method of using a switchplexer to perform test operations on a radio device, comprising:
   providing a plurality of test ports corresponding to a plurality of radio device ports;
   providing a plurality of switches comprising at a least one transmitter switch and at least one receiver switch;

generating a test signal measurement value corresponding to the presence of a test signal at individual test ports of said plurality of test ports; and using processing logic to actuate said plurality of switches to route said test signal between said individual test ports;

wherein said test signal measurement values are used to perform self-test operations associated with a transmitter and/or a receiver of said radio device.

20. A switchplexer for performing calibration operations on a radio device, comprising:

a plurality of test ports corresponding to a plurality of radio device ports, the plurality of test ports comprising at least a transmitter test port and a receiver test port;

a plurality of switches comprising at least a transmitter switch and a receiver switch, the transmitter switch configured to allow testing via a transmitter path and the receiver switch configured to allow testing via a receiver path;

a circuit operable to provide a test signal measurement value corresponding to the presence of a test signal at individual test ports of said plurality of test ports; and processing logic operable to actuate said plurality of switches to route said test signal between said individual test ports;

wherein said test signal measurement values are used to perform calibration operations associated with a transmitter and/or a receiver of said radio device.

\* \* \* \* \*